US009512911B2

(12) United States Patent  
Schoolcraft

(10) Patent No.: US 9,512,911 B2  
(45) Date of Patent: Dec. 6, 2016

(54) SPLIT POWER CONTINUOUSLY VARIABLE TRANSMISSION ARCHITECTURE INCORPORATING A PLANETARY TYPE BALL VARIATOR WITH MULTIPLE FIXED RANGES

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 65 days.

(21) Appl. No.: 14/517,410

(22) Filed: Oct. 17, 2014

(65) Prior Publication Data

US 2016/0109003 A1  Apr. 21, 2016

(51) Int. Cl.
*F16H 37/02* (2006.01)
*F16H 47/06* (2006.01)
(Continued)

(52) U.S. Cl.
CPC .......... *F16H 37/022* (2013.01); *F16H 37/086* (2013.01); *F16H 47/065* (2013.01);
(Continued)

(58) Field of Classification Search
CPC .................. F16H 37/022; F16H 47/065; F16H 2200/2053; F16H 2200/0091; F16H 2200/2051; F16H 2200/2056; F16H 2200/2058
See application file for complete search history.

(56) References Cited

U.S. PATENT DOCUMENTS

| 2,347,873 A | 5/1944 | Bloomfield |
| 2,410,818 A | 11/1946 | Grant |

(Continued)

FOREIGN PATENT DOCUMENTS

| DE | 102007013493 A1 | 9/2008 |
| DE | 102012216277 A1 | 3/2014 |

(Continued)

OTHER PUBLICATIONS

International Search Report and Written Opinion received for PCT International Application No. PCT/US2013/045580, completed Oct. 27, 2013, 3 pages.

(Continued)

*Primary Examiner* — Jacob S Scott
*Assistant Examiner* — Tinh Dang
(74) *Attorney, Agent, or Firm* — Barnes & Thornburg LLP

(57) ABSTRACT

A transmission includes an input shaft, an output shaft, at least three planetary gearsets, a variable-ratio unit, and at least nine clutches. The input shaft is configured to receive torque from a drive unit. The output shaft is configured to transmit torque to a load. The at least three planetary gearsets, the variable ratio-unit, and the at least nine clutches are arranged between the input shaft and the output shaft. The at least nine clutches are selectively engageable in combination with one another to select one of at least one reverse mode and at least four forward modes. The at least nine clutches include a first clutch engageable to couple the variable-ratio unit to one of the at least three planetary gearsets.

19 Claims, 21 Drawing Sheets

(51) Int. Cl.
*F16H 37/08* (2006.01)
*F16H 15/28* (2006.01)

(52) U.S. Cl.
CPC ...... *F16H 15/28* (2013.01); *F16H 2037/0873* (2013.01); *F16H 2200/201* (2013.01); *F16H 2200/2053* (2013.01); *F16H 2200/2056* (2013.01); *F16H 2200/2097* (2013.01)

(56) References Cited

U.S. PATENT DOCUMENTS

| | | | |
|---|---|---|---|
| 2,554,221 | A | 5/1951 | Stephenson et al. |
| 2,583,843 | A | 1/1952 | Herrick |
| 2,596,654 | A | 5/1952 | Clark et al. |
| 2,718,292 | A | 9/1955 | Meilander et al. |
| 2,841,330 | A | 7/1958 | Brewer et al. |
| 3,324,744 | A | 6/1967 | Roper |
| 3,410,157 | A | 11/1968 | Livezey |
| 3,432,016 | A | 3/1969 | Vogt |
| 3,481,436 | A | 12/1969 | Wilkowski |
| 3,631,741 | A | 1/1972 | Kelbel |
| 4,004,473 | A | 1/1977 | Pearce et al. |
| 4,107,776 | A | 8/1978 | Beale |
| 4,114,478 | A | 9/1978 | Clauss |
| 4,205,563 | A | 6/1980 | Gorrell |
| 4,258,585 | A | 3/1981 | Orshansky, Jr. et al. |
| 4,361,217 | A | 11/1982 | Bieber et al. |
| 4,381,828 | A | 5/1983 | Lunn et al. |
| 4,742,733 | A | 5/1988 | Schreiner |
| 4,754,664 | A | 7/1988 | Dick |
| 4,813,524 | A | 3/1989 | Reik |
| 4,856,374 | A | 8/1989 | Kreuzer |
| 4,950,208 | A | 8/1990 | Tomlinson |
| 5,011,463 | A | 4/1991 | Jarchow et al. |
| 5,062,050 | A | 10/1991 | Petzold et al. |
| 5,152,726 | A | 10/1992 | Lederman |
| 5,355,981 | A | 10/1994 | Itoh et al. |
| 5,407,024 | A | 4/1995 | Watson et al. |
| 5,441,130 | A | 8/1995 | Ha |
| 5,538,121 | A | 7/1996 | Hering |
| 5,584,776 | A | 12/1996 | Weilant et al. |
| 5,653,322 | A | 8/1997 | Vasa et al. |
| 5,662,198 | A | 9/1997 | Kojima et al. |
| 5,704,867 | A | 1/1998 | Bowen |
| 5,771,477 | A | 6/1998 | Showalter et al. |
| 5,833,566 | A | 11/1998 | Showalter |
| 5,884,526 | A | 3/1999 | Fogelberg |
| 5,893,812 | A | 4/1999 | Narai et al. |
| 5,918,715 | A | 7/1999 | Ruth et al. |
| 5,992,592 | A | 11/1999 | Showalter |
| 6,062,361 | A | 5/2000 | Showalter |
| 6,149,540 | A | 11/2000 | Johnson et al. |
| 6,149,543 | A | 11/2000 | Breen |
| 6,155,395 | A | 12/2000 | Braford |
| 6,251,045 | B1 | 6/2001 | Oliveira et al. |
| 6,301,538 | B1 * | 10/2001 | Kirchhoffer ........ F16H 61/0437 192/3.29 |
| 6,358,178 | B1 | 3/2002 | Wittkopp |
| 6,394,925 | B1 | 5/2002 | Wontner et al. |
| 6,460,671 | B1 | 10/2002 | Karambelas et al. |
| 6,585,619 | B2 | 7/2003 | Henzler |
| 6,588,559 | B2 | 7/2003 | Blair |
| 6,672,442 | B2 | 1/2004 | Kato et al. |
| 6,679,367 | B2 | 1/2004 | Baker et al. |
| 6,719,659 | B2 | 4/2004 | Geiberger et al. |
| 6,726,590 | B2 | 4/2004 | Henzler et al. |
| 6,761,658 | B1 | 7/2004 | Stettler, Jr. |
| 6,790,153 | B2 | 9/2004 | Goto |
| 6,834,750 | B2 | 12/2004 | Baker et al. |
| 6,846,257 | B2 | 1/2005 | Baker et al. |
| 6,855,086 | B2 | 2/2005 | Elser et al. |
| 6,949,045 | B2 | 9/2005 | Wafzig et al. |
| 7,052,430 | B2 | 5/2006 | Stevenson et al. |
| 7,189,182 | B2 | 3/2007 | Stevenson et al. |
| 7,195,576 | B2 | 3/2007 | Toyoda et al. |
| 7,204,337 | B2 | 4/2007 | Wildfellner |
| 7,217,216 | B2 | 5/2007 | Inoue |
| 7,219,569 | B2 | 5/2007 | Jastrzembowski et al. |
| 7,326,146 | B2 | 2/2008 | Miyata et al. |
| 7,347,801 | B2 | 3/2008 | Guenter et al. |
| 7,407,459 | B2 | 8/2008 | Greenwood et al. |
| 8,083,631 | B2 | 12/2011 | Shiohara |
| 8,142,323 | B2 | 3/2012 | Tsuchiya et al. |
| 8,152,673 | B2 | 4/2012 | Yanay |
| 8,298,111 | B2 * | 10/2012 | Kato ...................... F16H 3/663 475/280 |
| 8,298,112 | B2 | 10/2012 | Takada |
| 8,617,020 | B2 | 12/2013 | Winter |
| 8,758,181 | B2 | 6/2014 | Calvert |
| 8,845,477 | B2 | 9/2014 | Koch et al. |
| 8,986,150 | B2 | 3/2015 | Versteyhe et al. |
| 8,996,263 | B2 | 3/2015 | Quinn, Jr. et al. |
| 9,133,924 | B2 | 9/2015 | Schoolcraft |
| 9,163,705 | B1 | 10/2015 | Hwang et al. |
| 2002/0005325 | A1 | 1/2002 | Yamada |
| 2003/0051959 | A1 | 3/2003 | Blair |
| 2003/0199353 | A1 | 10/2003 | Bowen |
| 2003/0226415 | A1 | 12/2003 | Baker et al. |
| 2004/0104096 | A1 | 6/2004 | Genise |
| 2006/0025272 | A1 | 2/2006 | Pelouch |
| 2006/0189435 | A1 | 8/2006 | Flaig et al. |
| 2007/0272455 | A1 | 11/2007 | Lang et al. |
| 2007/0287572 | A1 | 12/2007 | Tabata et al. |
| 2008/0280722 | A1 | 11/2008 | Phillips et al. |
| 2009/0118912 | A1 | 5/2009 | Hugenroth et al. |
| 2009/0203486 | A1 | 8/2009 | Murray |
| 2009/0253543 | A1 | 10/2009 | Foster et al. |
| 2010/0093479 | A1 | 4/2010 | Carter et al. |
| 2010/0151984 | A1 | 6/2010 | Viitasalo et al. |
| 2011/0111910 | A1 | 5/2011 | Ideshio et al. |
| 2011/0144872 | A1 | 6/2011 | Long et al. |
| 2011/0300983 | A1 | 12/2011 | Kurokawa |
| 2012/0072084 | A1 | 3/2012 | Stoller et al. |
| 2013/0338888 | A1 | 12/2013 | Long et al. |
| 2013/0338889 | A1 | 12/2013 | Long et al. |
| 2013/0338893 | A1 | 12/2013 | Long et al. |
| 2014/0262672 | A1 | 9/2014 | Raszkowski et al. |
| 2014/0274540 | A1 | 9/2014 | Schoolcraft |

FOREIGN PATENT DOCUMENTS

| | | |
|---|---|---|
| EP | 1519084 A2 | 9/2004 |
| EP | 2113056 A1 | 11/2009 |
| JP | 2008075706 A | 4/2005 |
| JP | 2007232125 A | 9/2007 |
| WO | 9849455 A2 | 11/1998 |
| WO | 2010048029 A2 | 4/2010 |
| WO | 2014039900 | 3/2014 |
| WO | 2014125050 | 8/2014 |

OTHER PUBLICATIONS

U.S. Appl. No. 61/660,666, filed Dec. 16, 2009, (31 pages).
Utility U.S. Appl. No. 14/517,400, filed Oct. 17, 2014.
Utility U.S. Appl. No. 14/517,374, filed Oct. 17, 2014.
Utility U.S. Appl. No. 14/517,380, filed Oct. 17, 2014.
Utility U.S. Appl. No. 14/517,364, filed Oct. 17, 2014.
Utility U.S. Appl. No. 14/517,426, filed Oct. 17, 2014.
Search Report and Written Opinion from the International Searching Authority for Application No. PCT/US2015/056009, dated Feb. 25, 2016, 13 pages.
Search Report and Written Opinion for Application No. PCT/US2015/055999, dated Dec. 4, 2015, 10 pages.
Search Report and Written Opinion for Application No. PCT/US2015/055996, dated Jan. 4, 2016, 7 pages.
Search Report and Written Opinion for Application No. PCT/US2015/055993, dated Jan. 6, 2016, 8 pages.
Search Report and Written Opinion for Application No. PCT/US2015/056003, dated Jan. 6, 2016, 8 pages.

(56) References Cited

OTHER PUBLICATIONS

Search Report and Written Opinion for Application No. PCT/US2015/056007, dated Jan. 28, 2016, 8 pages.

* cited by examiner

SPLIT POWER CONTINUOUSLY VARIABLE TRANSMISSION ARCHITECTURE INCORPORATING A PLANETARY TYPE BALL VARIATOR WITH MULTIPLE FIXED RANGES

TECHNICAL FIELD

The present disclosure relates generally to continuously variable transmissions, and more particularly, to the architectures of continuously variable transmissions including ratio varying units.

BACKGROUND

Continuously variable transmissions (CVTs) may utilize a ratio varying unit (e.g., a "variator") to provide a continuous variation of transmission ratio rather than a series of predetermined ratios as provided in typical transmissions. The variator of a typical CVT is coupled between the transmission input and the transmission output via gearing and one or more clutches.

Continuously variable transmissions may use a variator and a planetary gear train to direct power flow along multiple power paths defined by the architecture of the continuously variable transmission. For instance, power may flow along a first path through the variator and along a second path through the planetary gear train. Many current architectures for continuously variable transmissions subject the variator to the entire power load flowing along one or more power paths of the continuously variable transmissions.

SUMMARY

According to one aspect of the present disclosure, a transmission includes an input shaft, an output shaft, at least three planetary gearsets arranged between the input shaft and the output shaft, a variable-ratio unit arranged between the input shaft and the output shaft, and at least nine clutches arranged between the input shaft and the output shaft. The input shaft is configured to receive torque from a drive unit. The output shaft is configured to transmit torque to a load. The at least nine clutches are selectively engageable in combination with one another to select one of at least one reverse mode and at least four forward modes. The at least nine clutches include a first clutch engageable to couple the variable-ratio unit to one of the at least three planetary gearsets.

In some embodiments, (i) the at least one reverse mode may include only two reverse modes, and (ii) the transmission may be operable to engage the first clutch in each of the two reverse modes and the at least four forward modes. The at least four forward modes may include only four forward modes.

In some embodiments, (i) the at least one reverse mode may include only three reverse modes, and (ii) the at least four forward modes may include only seven forward modes. Additionally, in some embodiments, (i) the at least three planetary gearsets may include only three planetary gearsets, and (ii) the at least nine clutches may include only nine clutches. Two of the three planetary gearsets may include an idler gear.

In some embodiments, the transmission may be operable to engage four of the at least nine clutches in each of the at least one reverse mode and the at least four forward modes. The transmission may be operable to engage (i) a pair of reverse clutches of the at least nine clutches in the at least one reverse mode and (ii) a pair of forward clutches of the at least nine clutches in each of the at least four forward modes. The transmission may be operable to engage the first clutch in each of the at least one reverse mode and the at least four forward modes.

According to another aspect of the present disclosure, a transmission includes a housing, an input shaft, an output shaft, a variable-ratio unit arranged between the input shaft and the output shaft, at least three planetary gearsets arranged between the input shaft and the output shaft, at least eight clutches arranged between the input shaft and the output shaft, and a launch device. The input shaft is configured to receive torque from a drive unit. The output shaft is configured to transmit torque to a load. The at least three planetary gearsets include (i) a first planetary gearset coupled to the input shaft and the variable-ratio unit and (ii) a second planetary gearset coupled to the first planetary gearset, the variable-ratio unit, and the housing. The at least eight clutches are selectively engageable in combination with one another to select one of at least two reverse modes and at least four forward modes. The launch device is coupled between the variable-ratio unit and the second planetary gearset. The launch device is operable to transmit torque between the variable-ratio unit and the second planetary gearset.

In some embodiments, (i) a ring gear of the first planetary gearset may be coupled to the input shaft, and (ii) a carrier of the first planetary gearset may be coupled to the input of the variable-ratio unit. In some embodiments, (i) a ring gear of the second planetary gearset may be coupled to a sun gear of the first planetary gearset, (ii) a sun gear of the second planetary gearset may be coupled to the output of the variable-ratio unit through the launch device, and (iii) a carrier of the second planetary gearset may be coupled to the housing. In some embodiments, the launch device may be a launch clutch. Additionally, in some embodiments, the launch device may be a torque converter.

In some embodiments, (i) the at least three planetary gearsets may include a third planetary gearset and (ii) two of the at least eight clutches may each be engageable to couple the third planetary gearset to the output shaft. A first clutch of the two clutches may be engageable to couple a ring gear of the third planetary gearset to the output shaft. A second clutch of the two clutches may be engageable to couple a carrier of the third planetary gearset to the output shaft.

In some embodiments, two of the at least three planetary gearsets may include an idler gear.

According to another aspect of the present disclosure, a transmission includes a housing, an input shaft, an output shaft, a variable-ratio unit arranged between the input shaft and the output shaft, at least three planetary gearsets arranged between the input shaft and the output shaft, at least eight clutches arranged between the input shaft and the output shaft, and a launch device. The input shaft is configured to receive torque from a drive unit. The output shaft is configured to transmit torque to a load. The at least three planetary gearsets include (i) a first planetary gearset coupled to the input shaft and the variable-ratio unit, (ii) a second planetary gearset coupled to the first planetary gearset, the variable-ratio unit, and the housing, and (iii) a third planetary gearset having a first element coupled to the housing and a second element coupled to the output shaft. The at least eight clutches are selectively engageable in combination with one another to select one of at least two reverse modes and at least four forward modes. The launch device is coupled between the variable-ratio unit and the second planetary gearset. The launch device is operable to transmit torque between the variable-ratio unit and the second planetary gearset.

According to another aspect of the present disclosure, a transmission is operable in a plurality of reverse operating modes and a plurality of forward operating modes and comprises an input shaft, a plurality of planetary gearsets, a variable-ratio unit, a launch device, and a plurality of torque-transmitting mechanisms. The input shaft is configured to receive torque from a drive unit and transmit the torque to an output shaft of the transmission. The plurality of planetary gearsets is arranged between the input shaft and the output shaft. The plurality of planetary gearsets includes a first planetary gearset, a second planetary gearset, and a third planetary gearset. Each of the plurality of planetary gearsets includes a sun gear, a ring gear, a carrier, and a plurality of planet gears. The variable-ratio unit is operable to produce continuously-variable torque output. The launch device is coupled to the variable-ratio unit. The plurality of torque transmitting mechanisms includes a first clutch, a second clutch, a third clutch, and a fourth clutch. The first clutch is engageable to couple the ring gear of the first planetary gearset to the sun gear of the third planetary gearset. The second clutch is engageable to couple the carrier of the second planetary gearset to the sun gear of the third planetary gearset. The third clutch is engageable to couple the ring gear of the first planetary gearset to the carrier of the third planetary gearset. The fourth clutch is engageable to couple the carrier of the second planetary gearset to the carrier of the third planetary gearset.

In some embodiments, the variable-ratio unit may include an input ring and an output ring. The launch device may be a launch clutch, and the launch clutch may be coupled to the output ring of the variable-ratio unit. The launch device may be a torque converter, and the torque converter may be coupled to the output ring of the variable-ratio unit. The plurality of torque transmitting mechanisms may include a variator bypass clutch. The variator bypass clutch may be engageable to couple the input ring of the variable-ratio unit to the output ring of the variable-ratio unit to prevent the variable-ratio unit from producing continuously-variable torque output in at least two of the plurality of reverse operating modes.

In some embodiments, the ring gear of the first planetary gearset may be coupled to the sun gear of the second planetary gearset. Each component of the second planetary gearset may be configured to rotate. At least one of the first planetary gearset and the second planetary gearset may include at least one idler-planet gear. Each of the first planetary gearset and the second planetary gearset may include at least one idler-planet gear.

In some embodiments, the plurality of torque transmitting mechanisms may include a first forward clutch engageable to couple the ring gear of the third planetary gearset to a transmission housing to brake the ring gear of the third planetary gearset and a second forward clutch engageable to couple the carrier of the third planetary gearset to the output shaft. The first forward clutch and the second forward clutch may be contemporaneously engaged in each of the plurality of forward operating modes.

In some embodiments, the plurality of torque transmitting mechanisms may include a first reverse clutch engageable to couple the carrier of the third planetary gearset to a transmission housing to brake the carrier of the third planetary gearset and a second reverse clutch engageable to couple the ring gear of the third planetary gearset to the output shaft. The first reverse clutch and the second reverse clutch may be contemporaneously engaged in each of the plurality of reverse operating modes.

According to another aspect of the present disclosure, a transmission is operable in a plurality of reverse operating modes and a plurality of forward operating modes and comprises an input shaft, a plurality of planetary gearsets, a variable-ratio unit, and a plurality of torque transmitting mechanisms. The input shaft is configured to receive torque from a drive unit and transmit the torque to an output shaft of the transmission. The plurality of planetary gearsets is arranged between the input shaft and the output shaft. The plurality of planetary gearsets includes a first planetary gearset, a second planetary gearset, and a third planetary gearset. Each of the planetary gearsets includes a sun gear, a ring gear, a carrier, and a plurality of planet gears. The variable-ratio unit is operable to produce continuously-variable torque output, and the variable-ratio unit includes an input ring coupled to the carrier of the second planetary gearset and an output ring. The plurality of torque transmitting mechanisms includes a first clutch, a second clutch, a third clutch, a fourth clutch, and a launch clutch. The first clutch is engageable to couple the ring gear of the first planetary gearset to the sun gear of the third planetary gearset. The second clutch is engageable to couple the carrier of the second planetary gearset to the sun gear of the third planetary gearset. The third clutch is engageable to couple the ring gear of the first planetary gearset to the carrier of the third planetary gearset. The fourth clutch is engageable to couple the carrier of the second planetary gearset to the carrier of the third planetary gearset. The launch clutch is engageable to couple the output ring of the variable-ratio unit to the sun gear of the first planetary gearset.

In some embodiments, the plurality of torque transmitting mechanisms may include a variator bypass clutch. The variator bypass clutch may be engageable to couple the input ring of the variable-ratio unit to the output ring of the variable-ratio unit to prevent the variable-ratio unit from producing continuously-variable torque output in at least four of the plurality of forward operating modes.

In some embodiments, the plurality of torque transmitting mechanisms may include a first forward clutch engageable to couple the ring gear of the third planetary gearset to a transmission housing to brake the ring gear of the third planetary gearset and a second forward clutch engageable to couple the carrier of the third planetary gearset to the output shaft. The first forward clutch and the second forward clutch may be contemporaneously engaged in each of the plurality of forward operating modes.

In some embodiments, the plurality of torque transmitting mechanisms may include a first reverse clutch engageable to couple the carrier of the third planetary gearset to a transmission housing to brake the carrier of the third planetary gearset and a second reverse clutch engageable to couple the ring gear of the third planetary gearset to the output shaft. The first reverse clutch and the second reverse clutch may be contemporaneously engaged in each of the plurality of reverse operating modes.

In some embodiments, the plurality of reverse operating modes may include five reverse operating modes. The plurality of forward operating modes may include eleven forward operating modes.

According to another aspect of the present disclosure, a transmission is operable in a plurality of reverse operating modes and a plurality of forward operating modes and comprises an input shaft, a variable-ratio unit, and a plurality of torque transmitting mechanisms. The input shaft is configured to receive torque from a drive unit and transmit the torque to an output shaft of the transmission. The variable-ratio unit is arranged between the input shaft and the output shaft, and the variable-ratio unit is operable to produce continuously-variable torque output. The plurality of torque transmitting mechanisms includes a pair of reverse clutches, a pair of forward clutches, a plurality of range clutches, and a launch clutch coupled to the variable-ratio unit. Each of the pair of reverse clutches is contemporaneously engageable with at least one of the plurality of range clutches and the launch clutch to select one of the plurality of reverse operating modes. Each of the pair of forward clutches is contemporaneously engageable with at least one of the plurality of range clutches and the launch clutch to select one of the plurality of forward operating modes.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
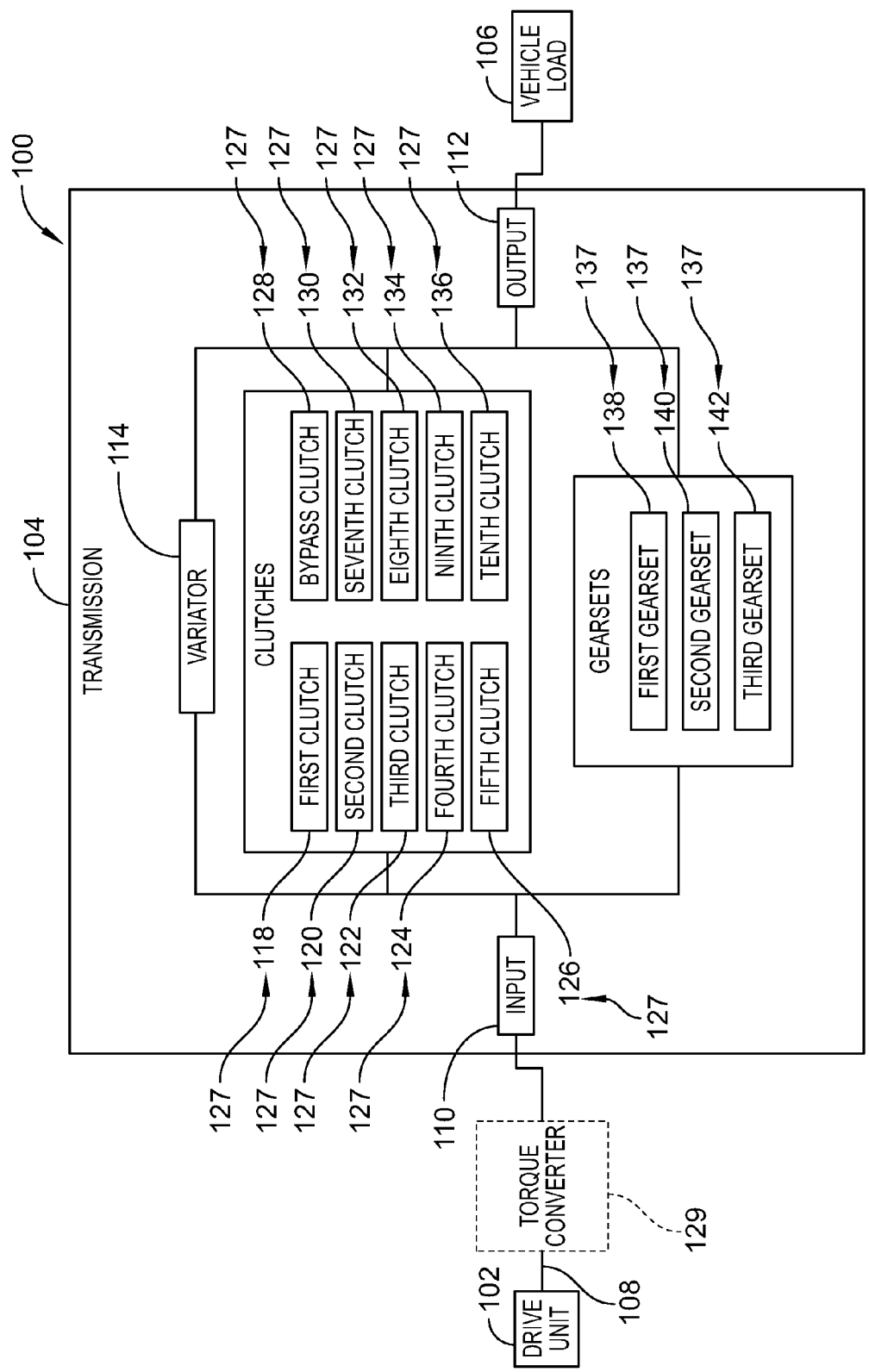
FIG. 1 is a simplified block diagram of a continuously variable transmission including a variator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 102, a transmission 104 coupled to the drive unit 102, and a vehicle load 106 coupled to the transmission 104. The drive unit 102 may be embodied as any type of motor or internal combustion engine having a reciprocating or a rotary configuration that provides rotational power to the transmission 104 and therethrough to the vehicle load 106. For instance, the drive unit 102 may be embodied as a four-stroke piston engine, a diesel engine, or a rotary engine. The vehicle load 106 may be embodied as, or otherwise include, drive wheels, caterpillar tracks, propels, etc. that impart the motor vehicle 100 with locomotion when driven by the drive unit 102 via the transmission 104. Additionally, the vehicle load 106 may be embodied as an auxiliary gearbox (e.g. a transfer case or drop box) or a power take-off device, such as a pump, mixer, lifter, shoveler, compressor, compactor, or blower.

In use, rotational power generated by the drive unit 102 is transmitted to the transmission 104 via a drive unit output shaft 108 included in the drive unit 102. The drive unit output shaft 108 is coupled to a transmission input shaft 110 included in the transmission 104. Additionally, rotational power received by the transmission 104 at the input shaft 110 is transmitted to a transmission output shaft 112 and therefrom to the vehicle load 106.

The transmission 104 ensures the controlled application of rotational power generated by the drive unit 102 to the vehicle load 106. The transmission 104, as discussed in more detail below, includes a plurality of gearsets that enable speed and torque generated by the drive unit 102 to be converted for use by the vehicle load 106.

The transmission 104 is operable in a plurality of operating modes to transmit rotational power supplied by the drive unit 102 from the transmission input shaft 110 to the transmission output shaft 112. Each operating mode enables at least one ratio of input speed (i.e., at the transmission input shaft 110) to output speed (i.e., at the transmission output shaft 112) to be achieved. As discussed below, operating modes of the transmission 104 in which a variator 114 is utilized enable a range of transmission ratios to be achieved whereas operating modes in which the variator 114 is not utilized enable only a single transmission ratio to be achieved.

The transmission 104 of FIG. 1 is illustratively embodied as a continuously variable transmission. The transmission 104 includes the variator 114, a plurality of clutches 127, and a plurality of gearsets 137 in addition to the input shaft 110 and the output shaft 112. Illustratively, the plurality of clutches 127 includes a first clutch 118, a second clutch 120, a third clutch 122, a fourth clutch 124, a launch clutch 126 (referred to generically in FIG. 1 as the "fifth clutch"), a variator bypass clutch 128, a seventh clutch 130, an eighth clutch 132, a ninth clutch 134, and a tenth clutch 136. Additionally, the illustrative plurality of gearsets 137 includes a first gearset 138, a second gearset 140, and a third gearset 142.

The continuously variable transmission 104 is operable, as discussed below, to transmit rotational power supplied from the drive unit 102 to the variator 114, the plurality of gearsets 137, and the plurality of clutches 127. The transmission 104 is also operable, as a result of the architecture of the transmission 104, to reduce the load experienced by the variator 114 as power is transmitted from the input shaft 110 to the output shaft 112 in multiple operating modes. In this manner, the continuously variable transmission 104 is similar to the infinitely variable transmission disclosed in U.S. Provisional Patent App. Ser. No. 61/798,476 entitled "SPLIT POWER INFINITELY VARIABLE TRANSMISSION ARCHITECTURE" by Brian Schoolcraft, the entirety of which is hereby incorporated by reference.

The variator 114, the plurality of clutches 127, and the plurality of gearsets 137 included in the transmission 104 are arranged between the input shaft 110 and the output shaft 112 of the transmission 104. Each of the gearsets included in the plurality of gearsets 137 may be supported by a mainshaft of the transmission 104 and may be capable of rotating freely and independently thereof. Each of the clutches may be selectively engaged to transmit power along a particular path between components of the transmission 104 as discussed below.

Each of the plurality of clutches 127 included in the transmission 104 is embodied as a torque-transmitting device configured to define a torque transfer path between components included in the transmission 104. By selectively engaging each of the plurality of clutches 127 in combination with one another, the plurality of clutches 127 define a torque transfer path between the input shaft 110 and the output shaft 112 and thereby effect a change from one operating mode to another. In one example, one or more of the plurality of clutches 127 may be embodied as a three-position dog clutch such as the three-position dog clutch disclosed in U.S. Provisional Patent App. Ser. No. 61/799,200 entitled "THREE-POSITION DOG CLUTCH" by Brian Schoolcraft, the entirety of which is hereby incorporated by reference. In other embodiments, one or more of the plurality of clutches 127 may be embodied as multi-plate wet clutches or controllable mechanical diodes, the engagement/disengagement of which are used to accomplish changes between operating modes. As discussed below, in the illustrative embodiment, the first clutch 118, the second clutch 120, the third clutch 122, the fourth clutch 124, the launch clutch 126, the variator bypass clutch 128, the eighth clutch 132, and the tenth clutch 136 are rotating clutches, whereas the seventh clutch 130 and the ninth clutch 134 are stationary clutches.

The first clutch 118, the second clutch 120, the third clutch 122, and the fourth clutch 124 of the plurality of clutches 127 are "range" clutches individually engageable in combination with the launch clutch 126 and the seventh and eighth clutches 130, 132 to select different forward operating modes of the transmission 104. Specifically, the first clutch 118 is contemporaneously engaged with the launch clutch 126 and the seventh and eighth clutches 130, 132 to select a first forward operating mode ("Mode 1") of the transmission 104. The second clutch 120 is contemporaneously engaged with the launch clutch 126 and the seventh and eighth clutches 130, 132 to select a second forward operating mode ("Mode 2") of the transmission 104. The third clutch 122 is contemporaneously engaged with the launch clutch 126 and the seventh and eighth clutches 130, 132 to a select a third forward operating mode ("Mode 3") of the transmission 104. The fourth clutch 124 is contemporaneously engaged with the launch clutch 126 and the seventh and eighth clutches 130, 132 to select a fourth forward operating mode ("Mode 4") of the transmission 104.

The seventh and eighth clutches 130, 132 of the plurality of clutches 127 collectively constitute a pair of "forward" clutches that, as discussed below, are contemporaneously engaged in each forward operating mode of the transmission 104. The ninth and tenth clutches 134, 136 of the plurality of clutches 127 collectively constitute a pair of "reverse" clutches that, as discussed below, are contemporaneously engaged in each reverse operating mode of the transmission 104. The ninth and tenth clutches 134, 136 are contemporaneously disengaged in each forward operating mode of the transmission 104, and the seventh and eighth clutches 130, 132 are contemporaneously disengaged in each reverse operating mode of the transmission 104.

The variator bypass clutch 128 of the plurality of clutches 127, as discussed below, is engageable to lock a variator input ring 144 to a variator output ring 148 so that the variator 114 achieves a 1:1 ratio (i.e., variator input speed is equal to variator output speed). When the variator bypass clutch 128 is engaged, the power load experienced by the variator 114 is removed, and all the power transmitted to the variator 114 flows instead through the variator bypass clutch 128.

Figure 4A:
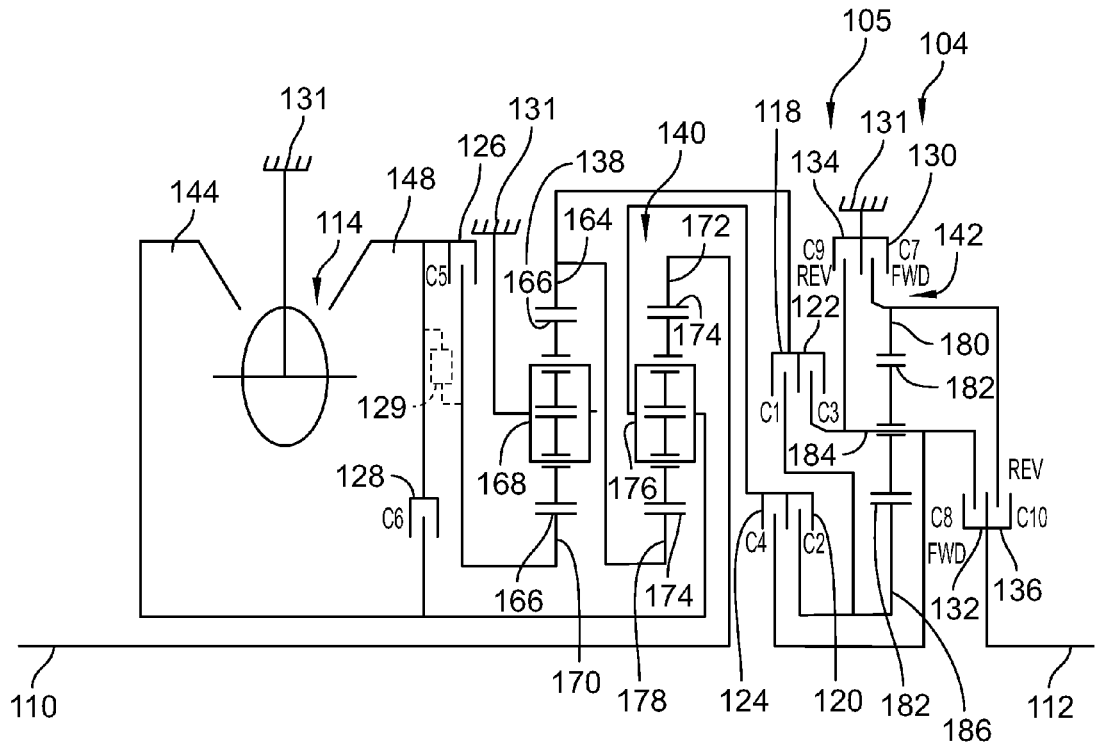
FIG. 4A is a schematic of the architecture of FIG. 3 and the associated transmission components showing the interconnections between the components in a first configuration.

The launch clutch 126 of the plurality of clutches 127 is configured to establish a mechanical coupling to transmit torque from the variator 114 to the first gearset 138 during certain operating conditions. In this manner, the launch clutch 126 serves as a launch device that is coupled to the variator 114. An alternative launch device such as a conventional torque converter 129 including a pump or impeller, a stator, and a turbine may be utilized in place of the launch clutch 126. The torque converter 129 may be coupled to the output ring 148 of the variator 114 as shown by FIG. 4A or placed between the output shaft 108 of the drive unit 102 and the input shaft 110 of the transmission 104 as shown by FIG. 1. The torque converter 129 may also include a lockup clutch configured to establish a mechanical coupling between the pump and the turbine to transmit torque therebetween in a conventional fashion.

The launch clutch 126 may be utilized during certain operating conditions of the motor vehicle 100 such as vehicle launch, low speed, and certain gear shifting conditions. By coupling the launch clutch 126 to the variator 114 as indicated above, the torque load experienced by the launch clutch 126 during those operating conditions may be reduced, and the torque load experienced by the launch clutch 126 in other operating conditions of the transmission 104 may be reduced as well. As discussed with regards to FIGS. 4A and 4B below, the launch clutch 126 is engageable to couple the variator output ring 148 to the first gearset 138.

Figure 2:
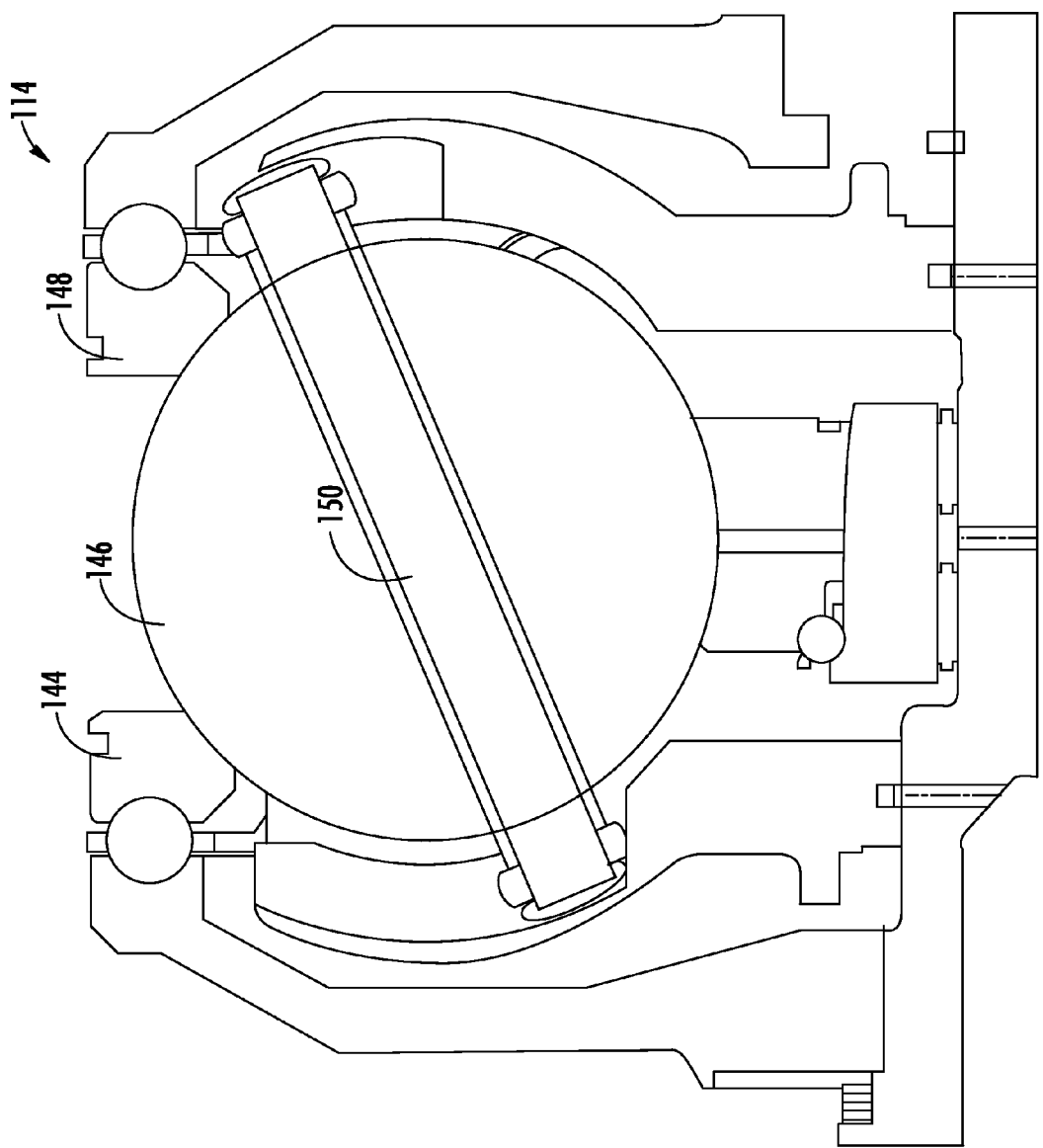
FIG. 2 is a side elevation view of the variator of the continuously variable transmission of FIG. 1.

Referring now to FIG. 2, in the illustrative embodiments, the variator 114 is embodied as a planetary-type ball variator and includes the input ring 144 and the output ring 148. The variator rings 144, 148 are spaced apart as shown in FIG. 2 to permit a ball 146 to be positioned between the rings 144, 148. The ball 146 is configured to tilt between the rings 144, 148 to vary the ratio achieved using the variator 114. An axle 150 encircles the ball 146 as shown in FIG. 2. The ball 146 is tilted by continuously tilting the axle 150 so that continuously-variable torque output is produced using the variator 114.

Figure 3:
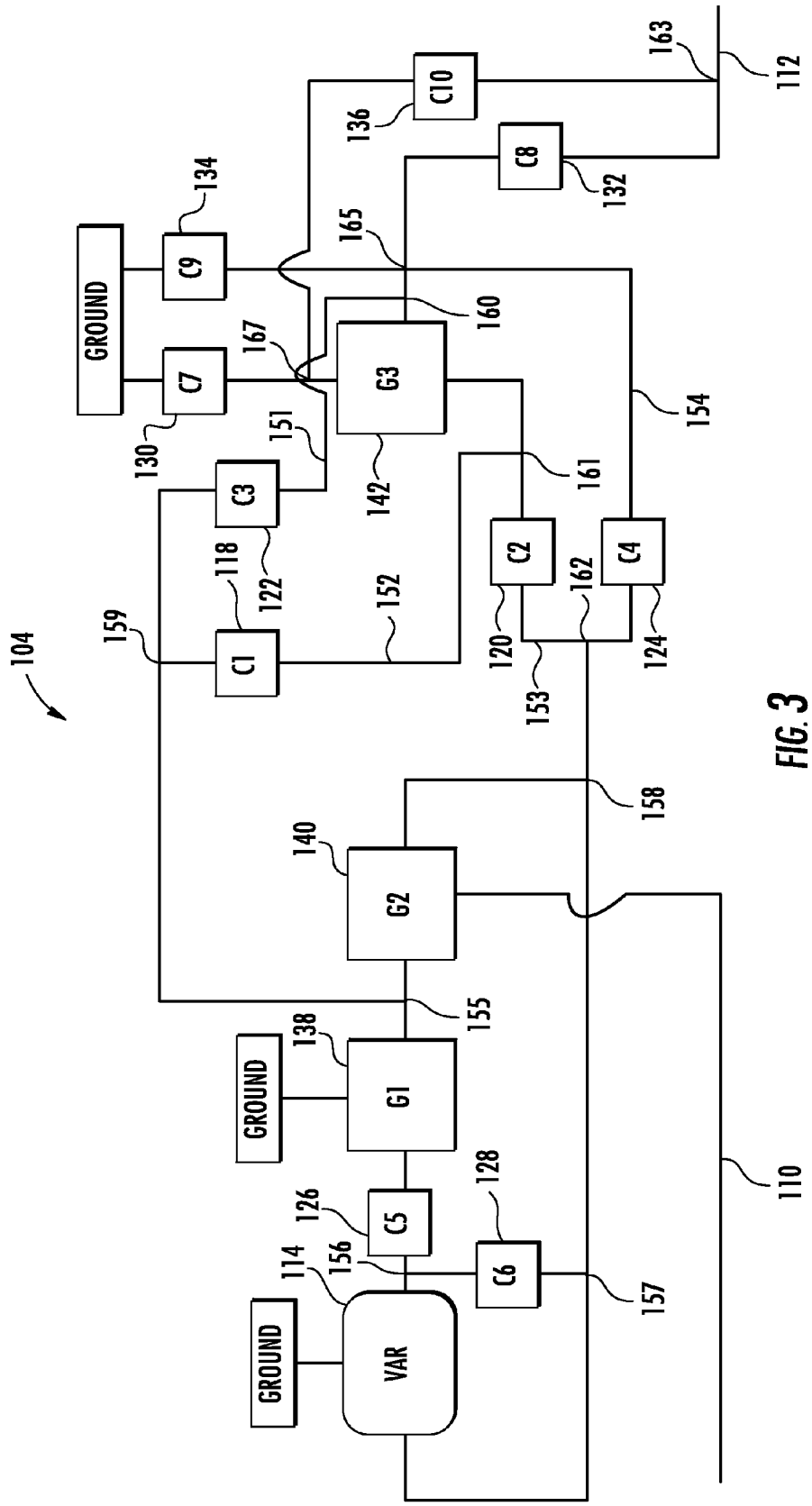
FIG. 3 is a block diagrammatic view of the architecture of the continuously variable transmission of FIG. 1 showing various components included in the continuously variable transmission.

Referring now to FIG. 3, the architecture of the transmission 104 is shown in which each gearset of the plurality of gearsets 137 is represented by a corresponding box (i.e., G1, G2, and G3) and the variator 114 is designated as "VAR." G1 designates the first gearset 138, G2 designates the second gearset 140, and G3 designates the third gearset 142. Each clutch of the plurality of clutches 127 is also represented by a box such that the following designations apply: C1 (the first clutch 118), C2 (the second clutch 120), C3 (the third clutch 122), C4 (the fourth clutch 124), C5 (the launch clutch 126), C6 (the variator bypass clutch 128), C7 (the seventh clutch 130), C8 (the eighth clutch 132), C9 (the ninth clutch 134), and C10 (the tenth clutch 136).

It should be appreciated that the architecture of the transmission 104 defines a plurality of power paths along which power is transmitted between components included in the transmission 104. In the illustrative embodiment, the plurality of power paths includes a power path 151, a power path 152, a power path 153, and a power path 154. In each operating mode of the transmission 104, power is transmitted between the input shaft 110 and the output shaft 112 along at least one of the power paths 151, 152, 153, 154.

The power path 151 is illustratively defined by the second gearset 140, a junction 155, the first gearset 138, the launch clutch 126, a junction 156, the variator bypass clutch 128, the variator 114, a junction 157, a junction 158, a junction 159, the third clutch 122, a junction 160, a junction 165, the eighth clutch 132, and a junction 163. Power may be transmitted from the input shaft 110 to the second gearset 140 and thereafter to the junction 163 through the junctions 155, 159, 160, 165 along the power path 151 as discussed below. Power may also be transmitted from the input shaft 110 to the second gearset 140 and thereafter to the junction 163 through the junctions 158, 157, 156, 155, 159, 160, 165 along the power path 151 as discussed below.

As illustrated in FIGS. 6-21, the second gearset 140 is a "mixing" planetary gearset that allows power transmitted thereto to be transmitted to the output shaft 112 along at least one of the power paths 151, 152, 153, 154. Power transmitted to the second gearset 140 from the input shaft 110 may be split so that one portion of the power transmitted to the second gearset 140 is transmitted to the junction 165 along the power path 151 and another portion of the power transmitted to the second gearset 140 is transmitted to the junction 165 along the power path 154 as shown, for example, in FIG. 19. In another example shown in FIG. 16, power transmitted to the second gearset 140 from the input shaft 110 may be split so that one portion of the power transmitted to the second gearset 140 is transmitted to the junction 160 along the power path 151 and another portion of the power transmitted to the second gearset 140 is transmitted to the junction 160 along the power path 153. In yet another example shown in FIG. 13, power transmitted to the second gearset 140 from the input shaft 110 may be split so that one portion of the power transmitted to the second gearset 140 is transmitted to a junction 161 along the power path 152 and another portion of the power transmitted to the second gearset 140 is transmitted to the junction 161 along the power path 153. Each component of the second gearset 140 (i.e., each of a sun gear, a carrier, a ring gear, and a plurality of planet gears included in the second gearset 140 as described in more detail below) rotates and is configured to transmit power (i.e., no component of the second gearset 140 is grounded).

The power path 151 utilizes a "fixed" and a "variable" sub-path to transmit power. Power transmitted along the "fixed" sub-path is transmitted at a fixed mechanical ratio. Conversely, power transmitted along the "variable" sub-path is transmitted over a continuously-variable ratio range, i.e., embodied as power transmitted through the variator 114. The "fixed" and "variable" sub-paths of the power path 151 are described below.

The "fixed" sub-path of the power path 151 corresponds to power flowing through the junctions 155, 159, 160 when the third clutch 122 and the seventh and eighth clutches 130, 132 are contemporaneously engaged. The "variable" sub-path of the power path 151 corresponds to power flowing between the junctions 155, 158 (i.e., through the variator 114 and the first gearset 138) when the third clutch 122, the launch clutch 126, and the seventh and eighth clutches 130, 132 are contemporaneously engaged and the variator bypass clutch 128 is not engaged.

The power path 152 is illustratively defined by the second gearset 140, the junction 155, the first gearset 138, the launch clutch 126, the junction 156, the variator bypass clutch 128, the variator 114, the junction 157, the junction 158, the junction 159, the first clutch 118, the junction 161, the third gearset 142, the eighth clutch 132, the tenth clutch 136, the junction 160, the junction 165, a junction 167, and the junction 163. Similar to the power path 151, the power path 152 utilizes a "fixed" and a "variable" sub-path to transmit power between components of the transmission 104. The "fixed" sub-path of the power path 152 corresponds to power flowing through the junctions 155, 159, 161, 160 when (i) the first clutch 118, the launch clutch 126, and the ninth and tenth clutches 134, 136 are contemporaneously engaged or (ii) the first clutch 118, the launch clutch 126, and the seventh and eighth clutches 130, 132 are contemporaneously engaged. The "variable" sub-path of the power path 152 corresponds to power flowing between the junctions 155, 158 (i.e., through the variator 114 and the first gearset 138) when (i) the first clutch 118, the launch clutch 126, and the ninth and tenth clutches 134, 136 are contemporaneously engaged and the variator bypass clutch 128 is not engaged or (ii) the first clutch 118, the launch clutch 126, and the seventh and eighth clutches 130, 132 are contemporaneously engaged and the variator bypass clutch 128 is not engaged.

The power path 153 is illustratively defined by the second gearset 140, the junction 155, the first gearset 138, the launch clutch 126, the junction 156, the variator bypass clutch 128, the variator 114, the junction 157, the junction 158, a junction 162, the second clutch 120, the junction 161, the third gearset 142, the eighth clutch 132, the tenth clutch 136, the junction 160, the junction 165, the junction 167, and the junction 163. Similar to the power path 152, the power path 153 utilizes a "fixed" and a "variable" sub-path to transmit power between components of the transmission 104. The "fixed" sub-path of the power path 153 corresponds to power flowing through the junctions 158, 162, 161, 160 when (i) the second clutch 120, the launch clutch 126, and the ninth and tenth clutches 134, 136 are contemporaneously engaged or (ii) the second clutch 120, the launch clutch 126, and the seventh and eighth clutches 130, 132 are contemporaneously engaged. The "variable" sub-path of the power path 153 corresponds to power flowing between the junctions 155, 158 (i.e., through the variator 114 and the first gearset 138) when (i) the second clutch 120, the launch clutch 126, and the ninth and tenth clutches 134, 136 are contemporaneously engaged and the variator bypass clutch 128 is not engaged or (ii) the second clutch 120, the launch clutch 126, and the seventh and eighth clutches 130, 132 are contemporaneously engaged and the variator bypass clutch 128 is not engaged.

The power path 154 is illustratively defined by the second gearset 140, the junction 155, the first gearset 138, the launch clutch 126, the junction 156, the variator bypass clutch 128, the variator 114, the junction 157, the junction 158, the junction 162, the fourth clutch 124, the eighth clutch 132, the junction 165, and the junction 163. Similar to the power path 153, the power path 154 utilizes a "fixed" and a "variable" sub-path to transmit power between components of the transmission 104. The "fixed" sub-path of the power path 154 corresponds to power flowing through the junctions 158, 162, 165 when the fourth clutch 124, the launch clutch 126, and the seventh and eighth clutches 130, 132 are contemporaneously engaged. The "variable" sub-path of the power path 154 corresponds to power flowing between the junctions 155, 158 (i.e., through the variator 114 and the first gearset 138) when the fourth clutch 124, the launch clutch 126, and the seventh and eighth clutches 130, 132 are contemporaneously engaged and the variator bypass clutch 128 is not engaged.

Referring now to FIG. 4A, the variator 114, the plurality of gearsets 137, and the plurality of clutches 127 of the transmission 104 are physically arranged between the input shaft 110 and the output shaft 112 of the transmission 104 in a first configuration 105 of the present disclosure. In the illustrative configuration 105, the variator 114 is positioned in front of the plurality of clutches 127 and the plurality of gearsets 137 relative to the input shaft 110 as shown in FIG. 4A.

The first gearset 138 of the plurality of gearsets 137 is configured to receive power from the input shaft 110 that is transmitted to the second gearset 140 and therefrom to the first gearset 138 as shown in FIG. 4A. The first gearset 138 is illustratively an idler-planet planetary gearset that includes a ring gear 164, a plurality of planet gears 166 including one or more idler-planet gears, a carrier 168, and a sun gear 170. Each of the planet gears 166 is intermeshed with either the ring gear 164 or the sun gear 170 and another one of the planet gears 166, and each of the planet gears 166 is supported for rotation by the carrier 168. Power from the input shaft 110 is transmitted to the second gearset 140 and thereafter to the ring gear 164. The ring gear 164 is coupled to the second gearset 140, and the carrier 168 is coupled to a stationary, non-rotating part of the transmission 104, thereby preventing the carrier 168 from rotating (i.e., braking the carrier 168). For instance, the carrier 168 may be coupled to a housing 131 of the transmission 104. The launch clutch 126 is engageable to couple the sun gear 170 to the output ring 148 of the variator 114. The first clutch 118 is engageable to couple the ring gear 164 to the third gearset 142, and the third clutch 122 is engageable to couple the ring gear 164 to the third gearset 142.

The second gearset 140 of the plurality of gearsets 137 is configured to receive power directly from the input shaft 110 as shown in FIG. 4A. The second gearset 140 is illustratively an idler-planet planetary gearset that includes a ring gear 172, a plurality of planet gears 174 including one or more idler-planet gears, a carrier 176, and a sun gear 178. Each of the planet gears 174 is intermeshed with either the ring gear 172 or the sun gear 178 and another one of the planet gears 174, and each of the planet gears 174 is supported for rotation by the carrier 176. Power from the input shaft 110 is transmitted to the ring gear 172. The sun gear 178 is coupled to the ring gear 164 of the first gearset 138. The carrier 176 is coupled to the input ring 144 of the variator 114, and the variator bypass clutch 128 is engageable to couple the carrier 176 to the output ring 148 of the variator 114 to bypass the variator 114 as indicated above. The second clutch 120 is engageable to couple the carrier 176 to the third gearset 142, and the fourth clutch 122 is engageable to couple the carrier 176 to the third gearset 142.

The third gearset 142 of the plurality of gearsets 137 is configured to receive power transmitted thereto from at least one of the second gearset 140 and the first gearset 138 as shown in FIG. 4A. The third gearset 142 is illustratively a simple planetary gearset that includes a ring gear 180, a plurality of planet gears 182, a carrier 184, and a sun gear 186. Each of the planet gears 182 is intermeshed with the ring gear 180 and the sun gear 186, and each of the planet gears 182 is supported for rotation by the carrier 184. The first clutch 118 is engageable to couple the sun gear 186 to the ring gear 164 of the first gearset 138, and the second clutch 120 is engageable to couple the sun gear 186 to the carrier 176 of the second gearset 140. The third clutch 122 is engageable to couple the carrier 184 to the ring gear 164 of the first gearset 138, and the fourth clutch 124 is engageable to couple the carrier 184 to the carrier 176 of the second gearset 140. The ninth clutch 134 is engageable to couple the carrier 184 to a stationary, non-rotating part of the transmission 104, thereby preventing the carrier 184 from rotating (i.e., braking the carrier 184). For instance, the carrier 184 may be coupled to the housing 131 of the transmission 104. The seventh clutch 130 is engageable to couple the ring gear 180 to a stationary, non-rotating part of the transmission 104 to prevent the ring gear 180 from rotating. The eighth clutch 132 is engageable to couple the carrier 184 to the output shaft 112, and the tenth clutch 136 is engageable to couple the ring gear 180 to the output shaft 112. When the seventh and eighth clutches 130, 132 are contemporaneously engaged in each forward operating mode of the transmission 104, the ring gear 180 is braked and the carrier 184 is coupled to the output shaft 112. When the ninth and tenth clutches 134, 136 are contemporaneously engaged in each reverse operating mode of the transmission 104, the carrier 184 is braked and the ring gear 180 is coupled to the output shaft 112.

Figure 4B:
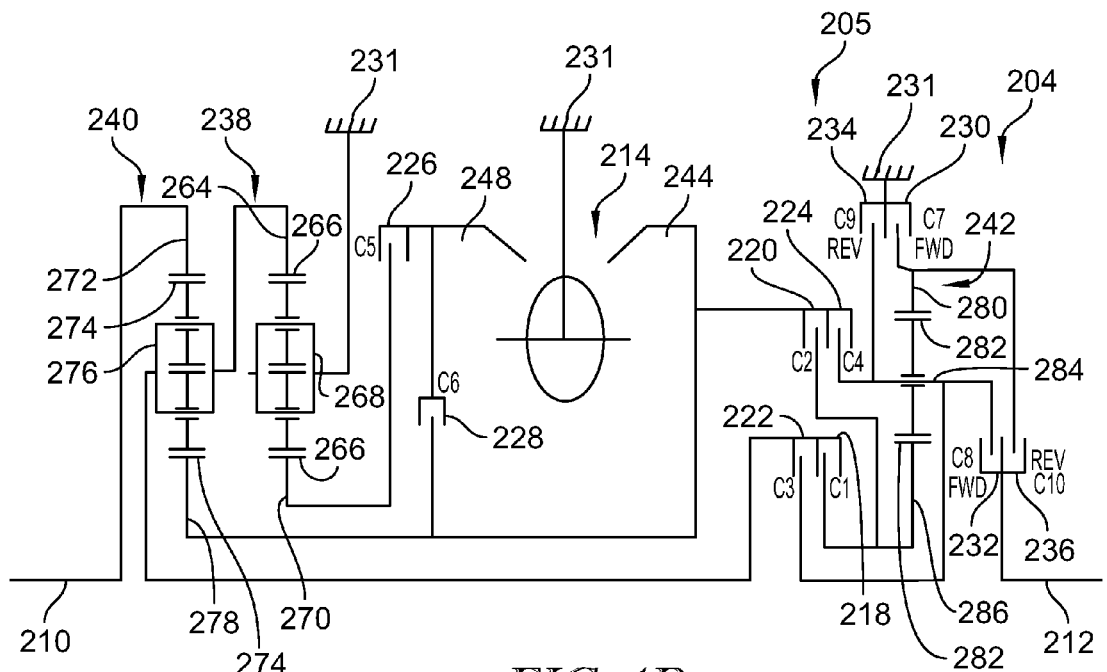
FIG. 4B is a schematic of the architecture of FIG. 3 and the associated transmission components showing the interconnections between the components in a second configuration.

Referring now to FIG. 4B, the variator, the plurality of gearsets, and the plurality of clutches are shown physically arranged between the input shaft 110 and the output shaft 112 in a second configuration 205 of the present disclosure. For the sake of clarity, components arranged in the second configuration 205 shown in FIG. 4B are designated with "200" series labels, whereas components arranged in the first configuration 105 shown in FIG. 4A are designated with "100" series labels.

The first gearset 238 of the plurality of gearsets 237 is configured to receive power from the input shaft 210 that is transmitted to the second gearset 240 and therefrom to the first gearset 238 as shown in FIG. 4B. The first gearset 238 is illustratively an idler-planet planetary gearset that includes a ring gear 264, a plurality of planet gears 266 including one or more idler-planet gears, a carrier 268, and a sun gear 270. Each of the planet gears 266 is intermeshed with either the ring gear 264 or the sun gear 270 and another one of the planet gears 266, and each of the planet gears 266 is supported for rotation by the carrier 268. Power from the input shaft 210 is transmitted to the second gearset 240 and thereafter to the ring gear 264 coupled to the second gearset 240. The carrier 268 is coupled to a stationary, non-rotating part of the transmission 204, thereby preventing the carrier 268 from rotating (i.e., braking the carrier 268). For instance, the carrier 268 may be coupled to a housing 231 of the transmission 204. The launch clutch 226 is engageable to couple the sun gear 270 to the output ring 248 of the variator 214.

The second gearset 240 of the plurality of gearsets 237 is configured to receive power directly from the input shaft 210 as shown in FIG. 4B. The second gearset 240 is illustratively an idler-planet planetary gearset that includes a ring gear 272, a plurality of planet gears 274 including one or more idler-planet gears, a carrier 276, and a sun gear 278. Each of the planet gears 274 is intermeshed with either the ring gear 272 or the sun gear 278 and another one of the planet gears 274, and each of the planet gears 274 is supported for rotation by the carrier 276. Power from the input shaft 210 is transmitted to the ring gear 272. The carrier 276 is coupled to the ring gear 264 of the first gearset 238. The sun gear 278 is coupled to the input ring 244 of the variator 214, and the variator bypass clutch 228 is engageable to couple the sun gear 278 to the output ring 248 of the variator 214 to bypass the variator 214 as indicated above. The first clutch 218 is engageable to couple the carrier 276 to the third gearset 242, and the third clutch 222 is engageable to couple the carrier 276 to the third gearset 242.

The third gearset 242 of the plurality of gearsets 237 is configured to receive power transmitted thereto from at least one of the second gearset 240 and the first gearset 238 as shown in FIG. 4B. The third gearset 242 is illustratively a simple planetary gearset that includes a ring gear 280, a plurality of planet gears 282, a carrier 284, and a sun gear 286. Each of the planet gears 282 is intermeshed with the ring gear 280 and the sun gear 286, and each of the planet gears 282 is supported for rotation by the carrier 284. The first clutch 218 is engageable to couple the sun gear 286 to the carrier 276 of the second gearset 240, and the third clutch 122 is engageable to couple the carrier 284 to the carrier 276 of the second gearset 240. The second clutch 220 is engageable to couple the sun gear 286 to the input ring 244 of the variator 214, and the fourth clutch 224 is engageable to couple the carrier 284 to the input ring 244 of the variator 214. The ninth clutch 234 is engageable to couple the carrier 284 to a stationary, non-rotating part of the transmission 204, thereby preventing the carrier 284 from rotating (i.e., braking the carrier 284). The seventh clutch 230 is engageable to couple the ring gear 280 to a stationary, non-rotating part of the transmission 204 to prevent the ring gear 280 from rotating. The eighth clutch 232 is engageable to couple the carrier 284 to the output shaft 212, and the tenth clutch 236 is engageable to couple the ring gear 280 to the output shaft 212. When the seventh and eighth clutches 230, 232 are contemporaneously engaged in each forward operating mode of the transmission 204, the ring gear 280 is braked and the carrier 284 is coupled to the output shaft 212. When the ninth and tenth clutches 234, 236 are contemporaneously engaged in each reverse operating mode of the transmission 204, the carrier 284 is braked and the ring gear 280 is coupled to the output shaft 212.

Figure 5:
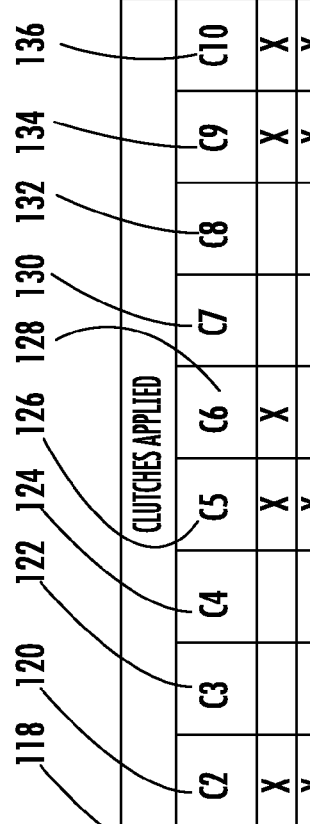
FIG. 5 is a table showing the various operating modes achievable by the continuously variable transmission of FIG. 1 and the transmission ratios associated with each mode.

Referring now to FIG. 5, a table 190 illustrates the various operating modes of the transmission 104, the clutches applied in each mode, the transmission ratio(s) achieved in each mode, and the figures in which the operating modes are shown. The transmission 104 is operable in six operating modes to achieve a variable transmission ratio within a defined transmission ratio range. In all other operating modes, as discussed below, the transmission 104 achieves a single transmission ratio. The launch clutch 126 is engaged in every operating mode of the transmission 104 as shown in FIG. 5.

The transmission 104 is operable in a first variator bypass reverse operating mode (i.e., "Bypass R2"), when the second clutch 120, the launch clutch 126, the variator bypass clutch 128, and the ninth and tenth clutches 134, 136 are contemporaneously engaged as shown in FIG. 5, to achieve a single transmission ratio of −0.625. Because the variator 114 is bypassed in the "Bypass R2" mode, only a single fixed transmission ratio is achieved by the transmission 104. The "Bypass R2" operating mode covers a reverse ratio.

The transmission 104 is operable in a first reverse operating mode (i.e., "Mode R2"), when the second clutch 120, the launch clutch 126, and the ninth and tenth clutches 134, 136 are contemporaneously engaged as shown in FIG. 5, to achieve a variable transmission ratio within the ratio range of −0.804 (minimum) to −0.446 (maximum). The variable transmission ratio is achievable in "Mode R2" as a result of utilizing the variator 114.

The transmission 104 is operable in a first synchronous reverse operating mode (i.e., "Sync R1-R2"), when the first clutch 118, the second clutch 120, the launch clutch 126, and the ninth and tenth clutches 134, 136 are contemporaneously engaged as shown in FIG. 5, to achieve a fixed transmission ratio of −0.446. The ratio of −0.446 coincides with the maximum ratio achieved in the "Mode R2" operating mode and the minimum ratio achieved in the "Mode R1" operating mode (discussed below) so that the "Sync R1-R2" operating mode effects a transition (i.e., a synchronous shift) between those two modes. A single fixed transmission ratio is achieved by the transmission 104 in the "Sync R1-R2" mode because the variator 114 is effectively bypassed. The "Sync R1-R2" operating mode covers another reverse ratio.

The transmission 104 is operable in a second reverse variator bypass operating mode (i.e., "Bypass R1"), when the first clutch 118, the launch clutch 126, the variator bypass clutch 128, and the ninth and tenth clutches 134, 136 are contemporaneously engaged as shown in FIG. 5, to achieve a fixed transmission ratio of −0.347. Because the variator 114 is bypassed in the "Bypass R1" mode, only a single fixed transmission ratio is achieved by the transmission 104. The "Bypass R1" operating mode covers another reverse ratio.

The transmission 104 is operable in a second reverse operating mode (i.e., "Mode R1"), when the first clutch 118, the launch clutch 126, and the ninth and tenth clutches 134, 136 are contemporaneously engaged as shown in FIG. 5, to achieve a variable transmission ratio within the range of −0.446 (minimum) to −0.248 (maximum). The variable transmission ratio is achievable in "Mode R1" as a result of utilizing the variator 114.

The transmission 104 is operable in a first forward operating mode (i.e., "Mode 1"), when the first clutch 118, the launch clutch 126, and the seventh and eighth clutches 130, 132 are contemporaneously engaged as shown in FIG. 5, to achieve a variable transmission ratio within the ratio range of 0.171 (minimum) to 0.309 (maximum). The variable transmission ratio is achievable in "Mode 1" as a result of utilizing the variator 114.

The transmission 104 is operable in a first forward variator bypass operating mode (i.e., "Bypass 1"), when the first clutch 118, the launch clutch 126, the variator bypass clutch 128, and the seventh and eighth clutches 130, 132 are contemporaneously engaged as shown in FIG. 5, to achieve a fixed transmission ratio of 0.240. Because the variator 114 is bypassed in the "Bypass 1" mode, only a single fixed transmission ratio is achieved by the transmission 104. The "Bypass 1" operating mode covers a forward ratio.

The transmission 104 is operable in a first synchronous forward operating mode (i.e., "Sync 1-2"), when the first clutch 118, the second clutch 120, the launch clutch 126, and the seventh and eighth clutches 130, 132 are contemporaneously engaged as shown in FIG. 5, to achieve a fixed transmission ratio of 0.309. The ratio of 0.309 coincides with the maximum ratio achieved in the "Mode 1" operating mode and the minimum ratio achieved in the "Mode 2" operating mode (discussed below) so that the "Sync 1-2" operating mode effects a transition (i.e., a synchronous shift) between those two modes. A single fixed transmission ratio is achieved by the transmission 104 in the "Sync 1-2" mode because the variator 114 is effectively bypassed. The "Sync 1-2" operating mode covers another forward ratio.

The transmission 104 is operable in a second forward operating mode (i.e., "Mode 2"), when the second clutch 120, the launch clutch 126, and the seventh and eighth clutches 130, 132 are contemporaneously engaged as shown in FIG. 5, to achieve a variable transmission ratio within the ratio range of 0.309 (minimum) to 0.556 (maximum). The variable transmission ratio is achievable in "Mode 2" as a result of utilizing the variator 114.

The transmission 104 is operable in a second forward variator bypass operating mode (i.e., "Bypass 2"), when the second clutch 120, the launch clutch 126, the variator bypass clutch 128, and the seventh and eighth clutches 130, 132 are contemporaneously engaged as shown in FIG. 5, to achieve a fixed transmission ratio of 0.432. Because the variator 114 is bypassed in the "Bypass 2" mode, only a single fixed transmission ratio is achieved by the transmission 104. The "Bypass 2" operating mode covers another forward ratio.

The transmission 104 is operable in a second synchronous forward operating mode (i.e., "Sync 2-3"), when the second clutch 120, the third clutch 122, the launch clutch 126, and the seventh and eighth clutches 130, 132 are contemporaneously engaged as shown in FIG. 5, to achieve a fixed transmission ratio of 0.556. The ratio of 0.556 coincides with the maximum ratio achieved in the "Mode 2" operating mode and the minimum ratio achieved in the "Mode 3" operating mode (discussed below) so that the "Sync 2-3" operating mode effects a transition (i.e., a synchronous shift) between those two modes. A single fixed transmission ratio is achieved by the transmission 104 in the "Sync 2-3" mode because the variator 114 is effectively bypassed. The "Sync 2-3" operating mode covers another forward ratio.

The transmission 104 is operable in a third forward operating mode (i.e., "Mode 3"), when the third clutch 122, the launch clutch 126, and the seventh and eighth clutches 130, 132 are contemporaneously engaged as shown in FIG. 5, to achieve a variable transmission ratio within the ratio range of 0.556 (minimum) to 1.000 (maximum). The variable transmission ratio is achievable in "Mode 3" as a result of utilizing the variator 114.

The transmission 104 is operable in a third forward variator bypass operating mode (i.e., "Bypass 3"), when the third clutch 122, the launch clutch 126, the variator bypass clutch 128, and the seventh and eighth clutches 130, 132 are contemporaneously engaged as shown in FIG. 5, to achieve a fixed transmission ratio of 0.778. Because the variator 114 is bypassed in the "Bypass 3" mode, only a single fixed transmission ratio is achieved by the transmission 104. The "Bypass 3" operating mode covers another forward ratio.

The transmission 104 is operable in a third synchronous forward operating mode (i.e., "Sync 3-4"), when the third clutch 122, the fourth clutch 124, the launch clutch 126, and the seventh and eighth clutches 130, 132 are contemporaneously engaged as shown in FIG. 5, to achieve a fixed transmission ratio of 1.000. The ratio of 1.000 coincides with the maximum ratio achieved in the "Mode 2" operating mode and the minimum ratio achieved in the "Mode 4" operating mode (discussed below) so that the "Sync 3-4" operating mode effects a transition (i.e., a synchronous shift) between those two modes. A single fixed transmission ratio is achieved by the transmission 104 in the "Sync 3-4" mode because the variator 114 is effectively bypassed. The "Sync 3-4" operating mode covers another forward ratio.

The transmission 104 is operable in a fourth forward operating mode (i.e., "Mode 4"), when the fourth clutch 124, the launch clutch 126, and the seventh and eighth clutches 130, 132 are contemporaneously engaged as shown in FIG. 5, to achieve a variable transmission ratio within the ratio range of 1.000 (minimum) to 1.800 (maximum). The variable transmission ratio is achievable in "Mode 4" as a result of utilizing the variator 114.

The transmission 104 is operable in a fourth forward variator bypass operating mode (i.e., "Bypass 4"), when the fourth clutch 124, the launch clutch 126, the variator bypass clutch 128, and the seventh and eighth clutches 130, 132 are contemporaneously engaged as shown in FIG. 5, to achieve a fixed transmission ratio of 1.400. Because the variator 114 is bypassed in the "Bypass 4" mode, only a single fixed transmission ratio is achieved by the transmission 104. The "Bypass 4" operating mode covers another forward ratio.

Figure 6:
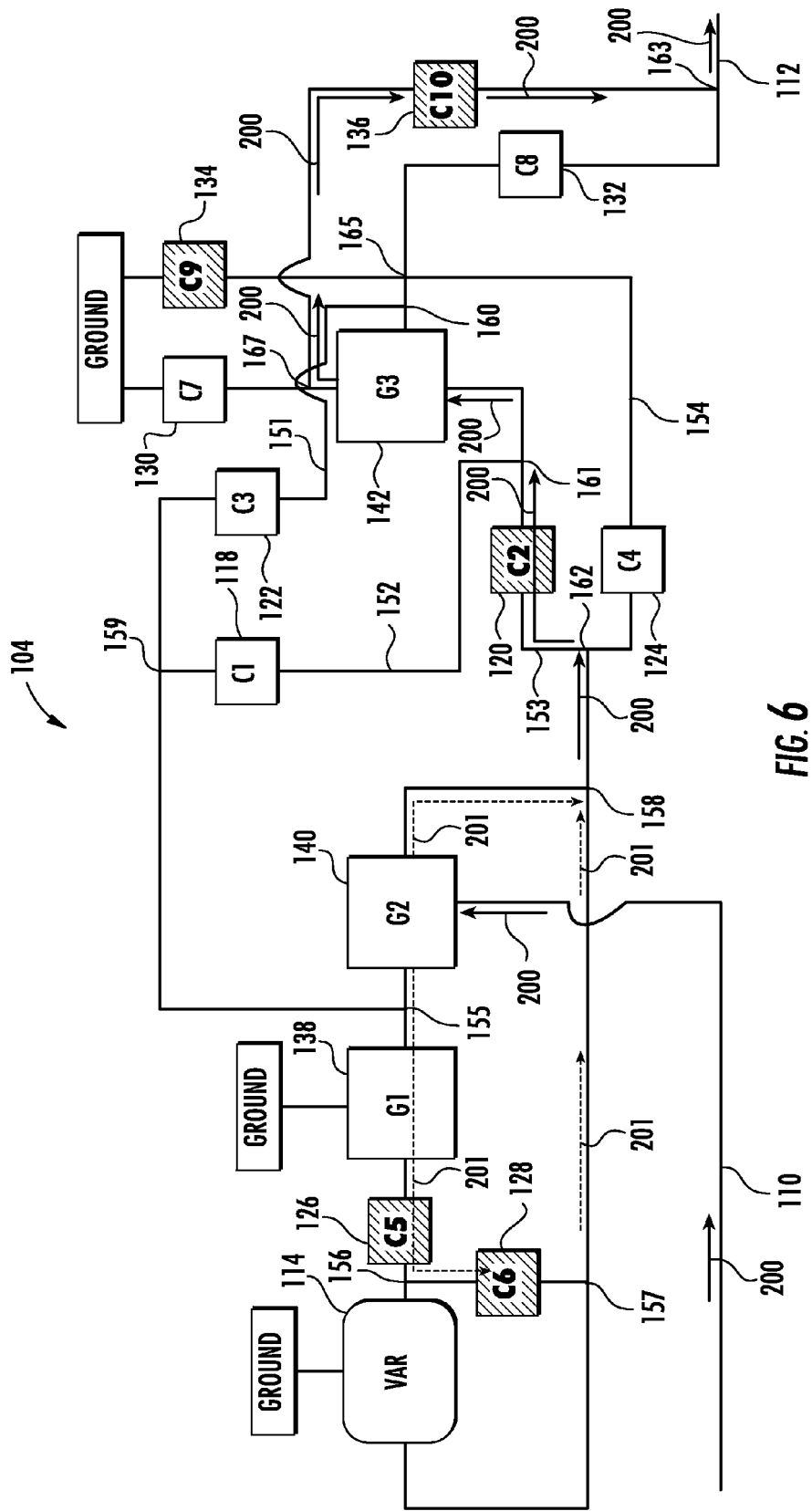
FIG. 6 is a block diagrammatic view of the continuously variable transmission of FIG. 3 showing power flow therethrough in a first reverse variator bypass operating mode.

Referring now to FIGS. 6-21, power flow from the input shaft 110 to the output shaft 112 of the transmission 104 is illustrated in each of the operating modes discussed above. Beginning with the "Bypass R2" mode of table 190, input power 200 (designated by the solid arrows) flows from the input shaft 110 to the second gearset 140 as shown in FIG. 6. Input power 200 transmitted to the second gearset 140 is modified by the "mixing" gearset 140 such that power output from the second gearset 140 becomes input power 201 as shown in FIG. 6. Input power 200 is reconstituted as discussed below at the junction 158, and input power 200 reconstituted at the junction 158 is transmitted to the junction 163 through the junctions 162, 161, 167, the second clutch 120, the third gearset 142, and the tenth clutch 136 as shown in FIG. 6. Input power 200 transmitted to the junction 163 is transmitted thereafter to the output shaft 112.

Input power 201 (designated by the dashed arrows) is transmitted from the second gearset 140 directly to the junction 158 and from the second gearset 140 to the junction 158 through the junctions 155, 156, 157, the first gearset 138, the launch clutch 126, and the variator bypass clutch 128 as shown in FIG. 6 (note that the variator 114 is bypassed and receives no power load). Input power 200 is thereby reconstituted at the junction 158, and the input power 200 is transmitted from the junction 158 to the output shaft 112 as indicated above.

Figure 7:
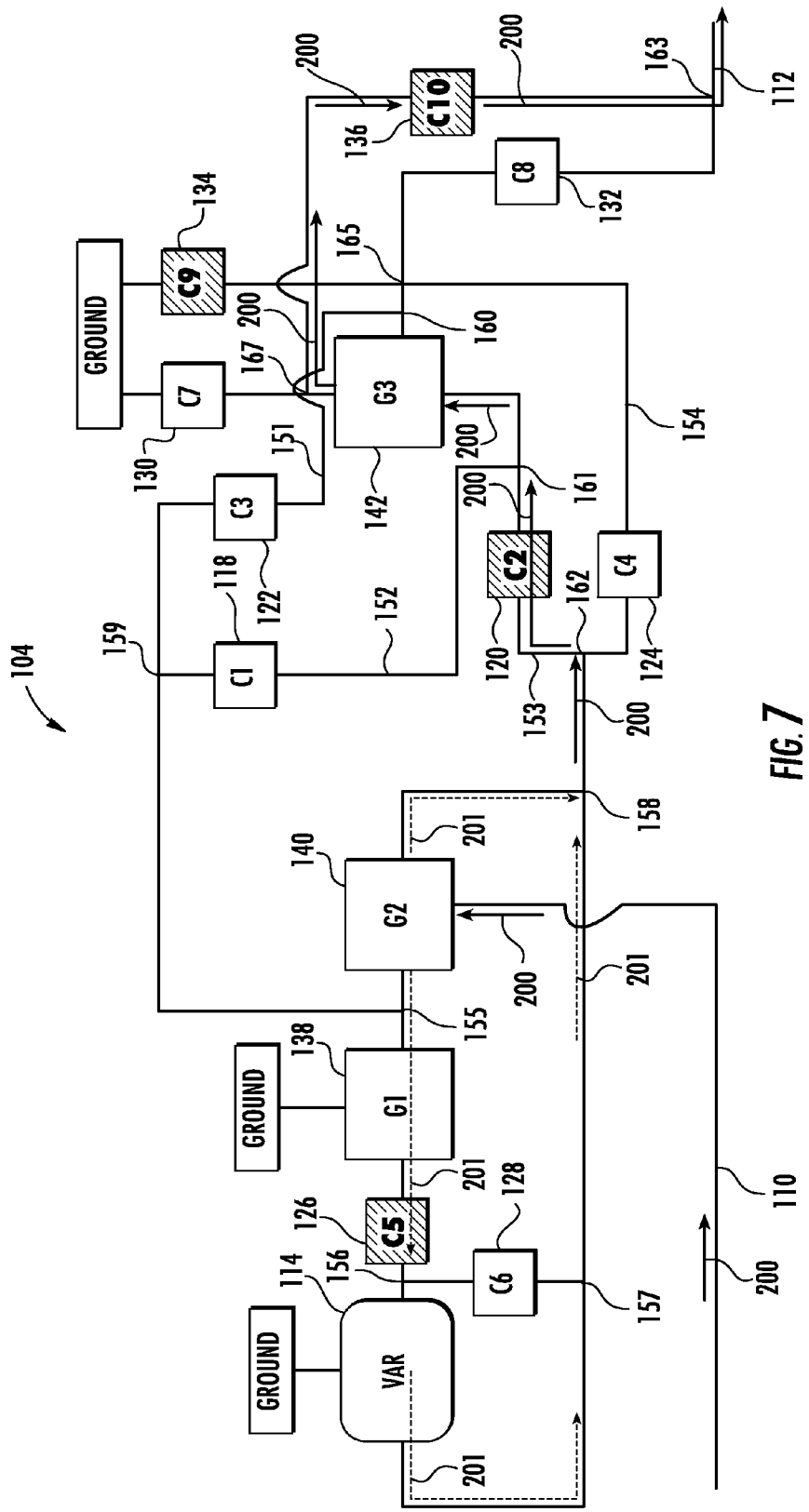
FIG. 7 is a block diagrammatic view of the continuously variable transmission of FIG. 3 showing power flow therethrough in a first reverse operating mode.

Turning now to "Mode R2" of table 190, power flow from the input shaft 110 to the output shaft 112 is shown in FIG. 7. Input power 200 (designated by the solid arrows) flows from the input shaft 110 to the second gearset 140 as shown in FIG. 7. Input power 200 transmitted to the second gearset 140 is modified by the "mixing" gearset 140 such that power output from the second gearset 140 becomes input power 201 as shown in FIG. 7. Input power 200 is reconstituted as discussed below at the junction 158, and input power 200 reconstituted at the junction 158 is transmitted to the junction 163 through the junctions 162, 161, 167, the second clutch 120, the third gearset 142, and the tenth clutch 136 as shown in FIG. 7. Input power 200 transmitted to the junction 163 is transmitted thereafter to the output shaft 112.

Input power 201 (designated by the dashed arrows) is transmitted from the second gearset 140 directly to the junction 158 and from the second gearset 140 to the junction 158 through the junctions 155, 156, 157, the first gearset 138, the launch clutch 126, and the variator 114 as shown in FIG. 7 (note that the variator 114 is subjected only to a portion of the power transmitted to the second gearset 140, i.e., input power 201). Input power 200 is thereby reconstituted at the junction 158, and the input power 200 is transmitted from the junction 158 to the output shaft 112 as indicated above.

Figure 8:
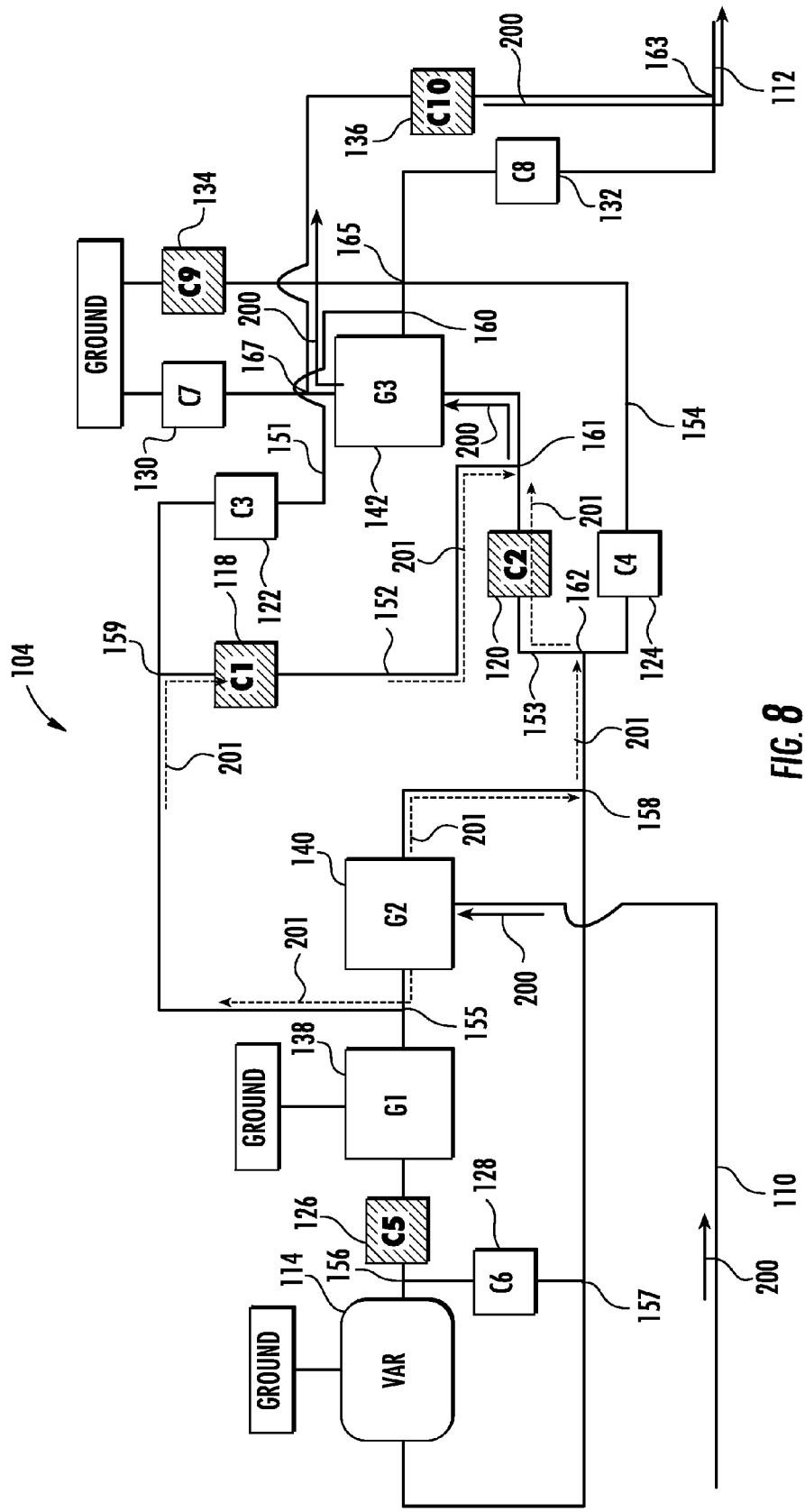
FIG. 8 is a block diagrammatic view of the continuously variable transmission of FIG. 3 showing power flow therethrough in a reverse synchronous operating mode.

Turning now to the "Sync R1-R2" mode of table 190, power flows from the input shaft 110 to the output shaft 112 as shown in FIG. 8. Input power 200 (designated by the solid arrows) flows from the input shaft 110 to the second gearset 140 as shown in FIG. 8. Input power 200 transmitted to the second gearset 140 is modified by the "mixing" gearset 140 such that power output from the second gearset 140 becomes input power 201 as shown in FIG. 8. Input power 200 is reconstituted as discussed below at the junction 161, and input power 200 reconstituted at the junction 161 is transmitted to the junction 163 through the third gearset 142, the junction 167, and the tenth clutch 136 as shown in FIG. 8. Input power 200 transmitted to the junction 163 is transmitted thereafter to the output shaft 112.

Input power 201 (designated by the dashed arrows) is transmitted from the second gearset 140 to the junction 161 through the junctions 155, 159 and the first clutch 118, and also from the second gearset 140 to the junction 161 through the junctions 158, 162 and the second clutch 120 as shown in FIG. 8 (note that the variator 114 receives no power load). Input power 200 is thereby reconstituted at the junction 161, and the input power 200 is transmitted from the junction 161 to the output shaft 112 as indicated above.

Figure 9:
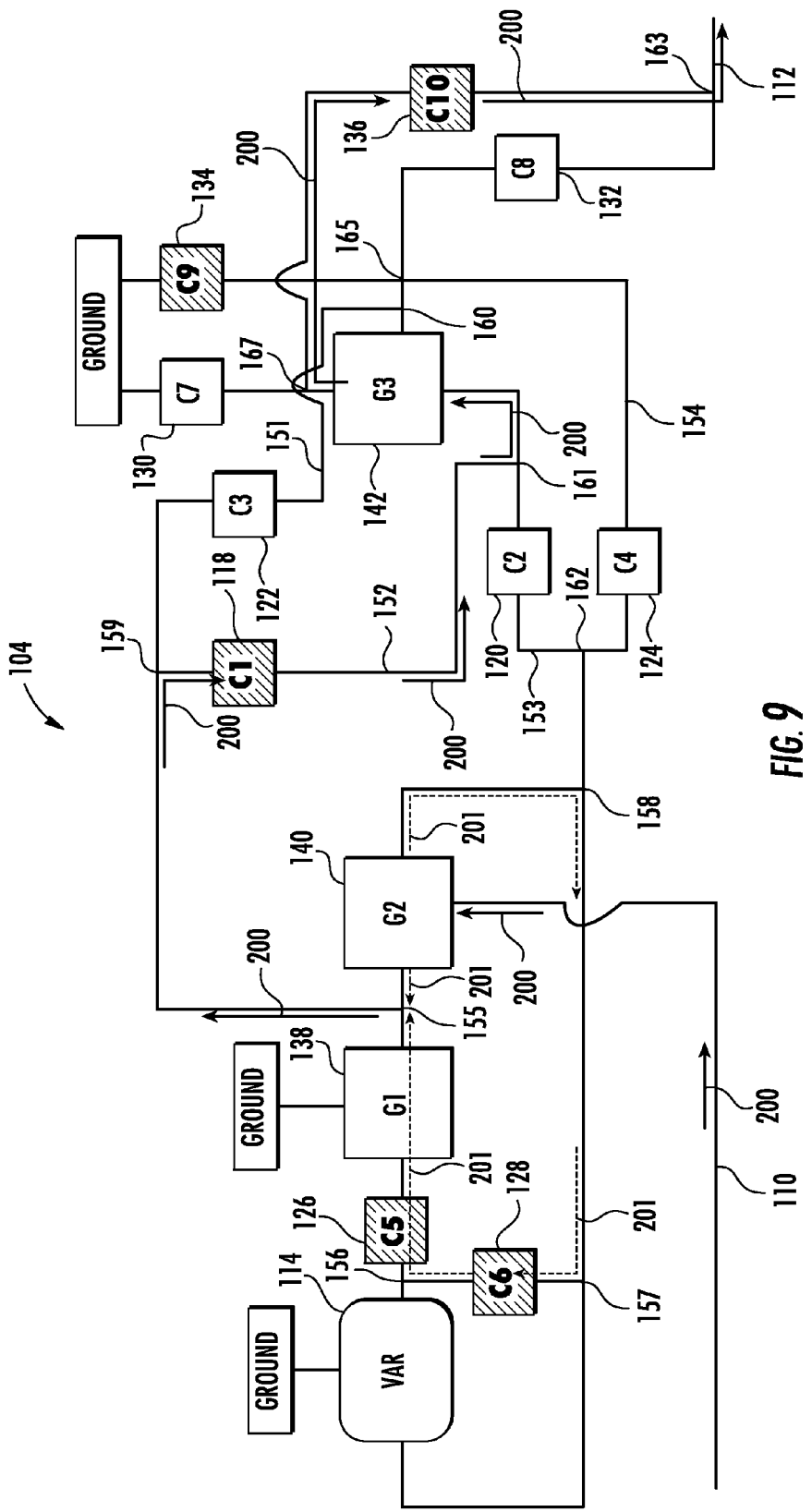
FIG. 9 is a block diagrammatic view of the continuously variable transmission of FIG. 3 showing power flow therethrough in a second reverse variator bypass operating mode.

Turning now to the "Bypass R1" mode of table 190, power flows from the input shaft 110 to the output shaft 112 as shown in FIG. 9. Input power 200 (designated by the solid arrows) flows from the input shaft 110 to the second gearset 140 as shown in FIG. 9. Input power 200 transmitted to the second gearset 140 is modified by the "mixing" gearset 140 such that power output from the second gearset 140 becomes input power 201 as shown in FIG. 9. Input power 200 is reconstituted as discussed below at the junction 155, and input power 200 reconstituted at the junction 155 is transmitted to the junction 163 through the junctions 159, 161, 167, the first clutch 118, the third gearset 142, and the tenth clutch 136 as shown in FIG. 9. Input power 200 transmitted to the junction 163 is transmitted thereafter to the output shaft 112.

Input power 201 (designated by the dashed arrows) is transmitted from the second gearset 140 directly to the junction 155 and also from the second gearset 140 to the junction 155 through the junctions 158, 157, 156, the first gearset 138, the launch clutch 126, and the variator bypass clutch 128 as shown in FIG. 9 (note that the variator 114 is bypassed and receives no power load). Input power 200 is thereby reconstituted at the junction 155, and the input power 200 is transmitted from the junction 155 to the output shaft 112 as indicated above.

Figure 10:
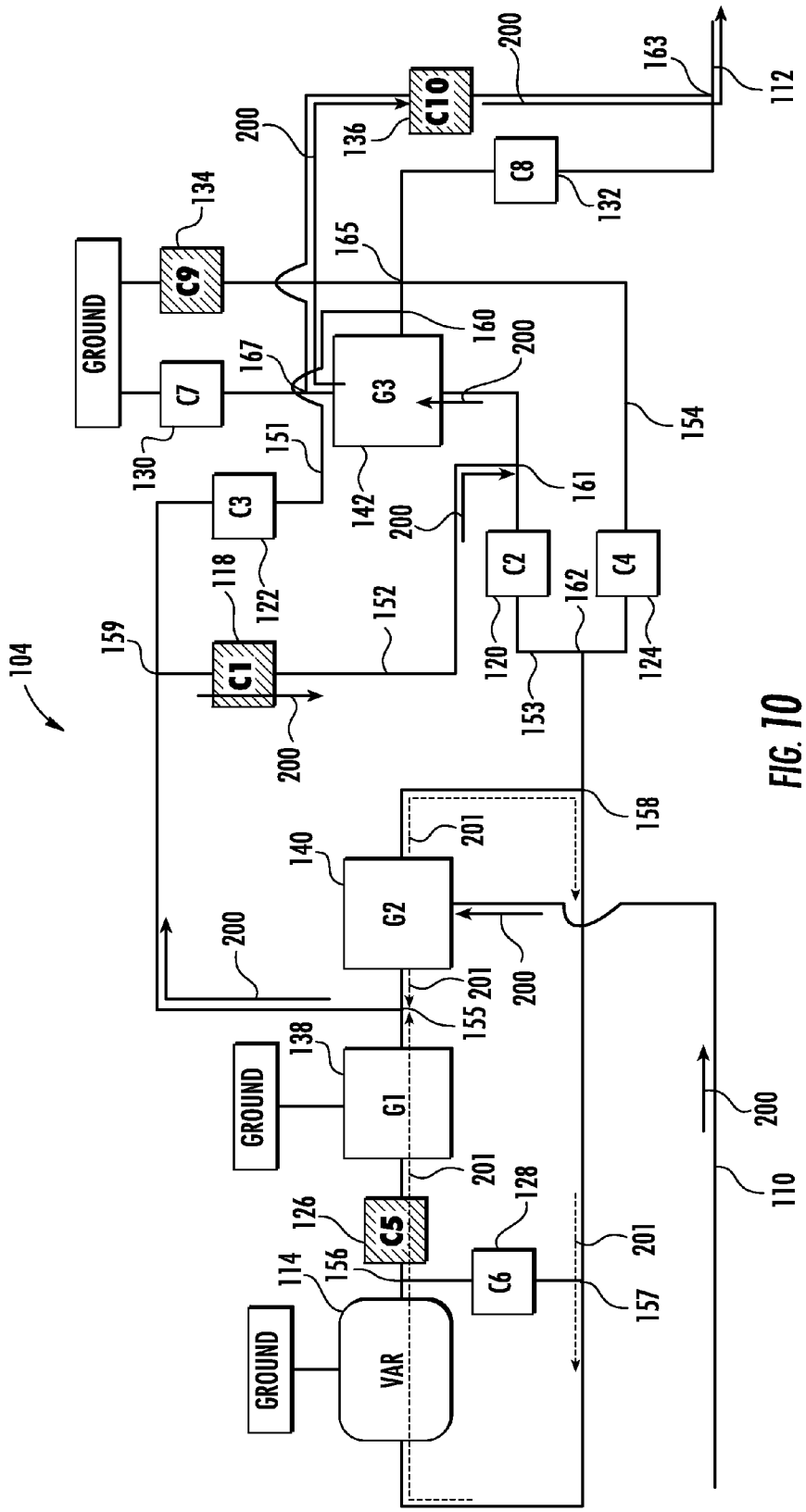
FIG. 10 is a block diagrammatic view of the continuously variable transmission of FIG. 3 showing power flow therethrough in a second reverse operating mode.

Turning now to "Mode R1" of table 190, power flows from the input shaft 110 to the output shaft 112 as shown in FIG. 10. Input power 200 (designated by the solid arrows) flows from the input shaft 110 to the second gearset 140 as shown in FIG. 10. Input power 200 transmitted to the second gearset 140 is modified by the "mixing" gearset 140 such that power output from the second gearset 140 becomes input power 201 as shown in FIG. 10. Input power 200 is reconstituted as discussed below at the junction 155, and input power 200 reconstituted at the junction 155 is transmitted to the junction 163 through the junctions 159, 161, 167, the first clutch 118, the third gearset 142, and the tenth clutch 136 as shown in FIG. 10. Input power 200 transmitted to the junction 163 is transmitted thereafter to the output shaft 112.

Input power 201 (designated by the dashed arrows) is transmitted from the second gearset 140 directly to the junction 155 and from the second gearset 140 to the junction 155 through the junctions 158, 157, 156, the first gearset 138, the launch clutch 126, and the variator 114 as shown in FIG. 10 (note that the variator 114 is subjected only to a portion of the input power 200 transmitted to the second gearset 140, i.e., split power 201). Input power 200 is thereby reconstituted at the junction 155, and the input power 200 is transmitted from the junction 155 to the output shaft 112 as indicated above.

Figure 11:
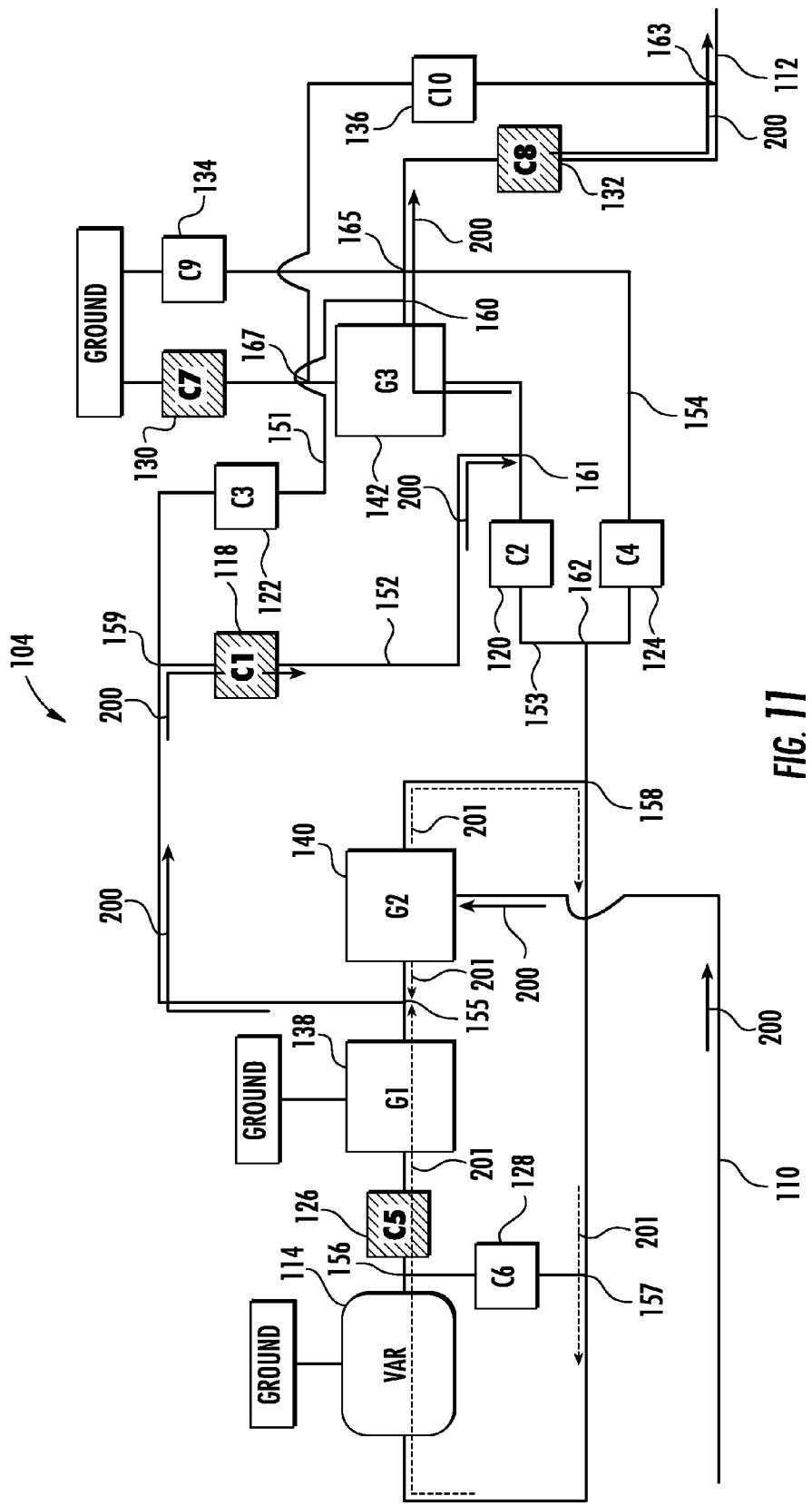
FIG. 11 is a block diagrammatic view of the continuously variable transmission of FIG. 3 showing power flow therethrough in a first forward operating mode.

Turning now to "Mode 1" of table 190, power flows from the input shaft 110 to the output shaft 112 as shown in FIG. 11. Input power 200 (designated by the solid arrows) flows from the input shaft 110 to the second gearset 140 as shown in FIG. 11. Input power 200 transmitted to the second gearset 140 is modified by the "mixing" gearset 140 such that power output from the second gearset 140 becomes input power 201 as shown in FIG. 11. Input power 200 is reconstituted as discussed below at the junction 155, and input power 200 reconstituted at the junction 155 is transmitted to the junction 163 through the junctions 159, 161, 160, 165, the first clutch 118, the third gearset 142, and the eighth clutch 132 as shown in FIG. 11. Input power 200 transmitted to the junction 163 is transmitted thereafter to the output shaft 112.

Input power 201 (designated by the dashed arrows) is transmitted from the second gearset 140 directly to the junction 155 and from the second gearset 140 to the junction 155 through the junctions 158, 157, 156, the first gearset 138, the launch clutch 126, and the variator 114 as shown in FIG. 11 (note that the variator 114 is subjected only to a portion of the input power 200 transmitted to the second gearset 140, i.e., input power 201). Input power 200 is thereby reconstituted at the junction 155, and the input power 200 is transmitted from the junction 155 to the output shaft 112 as indicated above.

Figure 12:
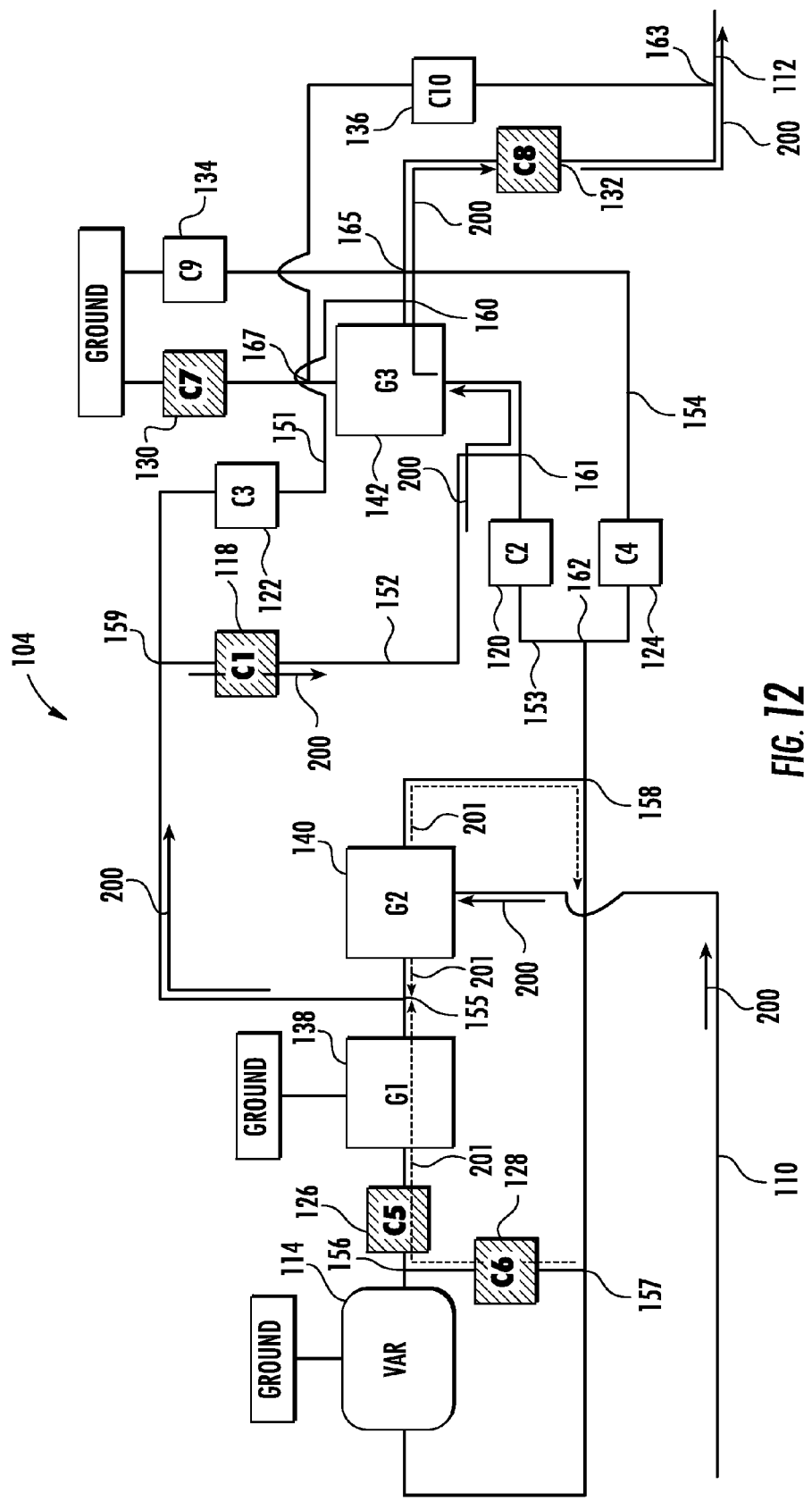
FIG. 12 is a block diagrammatic view of the continuously variable transmission of FIG. 3 showing power flow therethrough in a first forward variator bypass operating mode.

Turning now to the "Bypass 1" mode of table 190, power flows from the input shaft 110 to the output shaft 112 as shown in FIG. 12. Input power 200 transmitted to the second gearset 140 is modified by the "mixing" gearset 140 such that power output from the second gearset 140 becomes input power 201 as shown in FIG. 12. Input power 200 is reconstituted as discussed below at the junction 155, and input power 200 reconstituted at the junction 155 is transmitted to the junction 163 through the junctions 159, 161, 160, 165, the first clutch 118, the third gearset 142, and the eighth clutch 132 as shown in FIG. 12. Input power 200 transmitted to the junction 163 is transmitted thereafter to the output shaft 112.

Input power 201 (designated by the dashed arrows) is transmitted from the second gearset 140 directly to the junction 155 and from the second gearset 140 to the junction 155 through the junctions 158, 157, 156, the first gearset 138, the launch clutch 126, and the variator bypass clutch 128 as shown in FIG. 12 (note that the variator 114 is bypassed and receives no power load). Input power 200 is thereby reconstituted at the junction 155, and the input power 200 is transmitted from the junction 155 to the output shaft 112 as indicated above.

Figure 13:
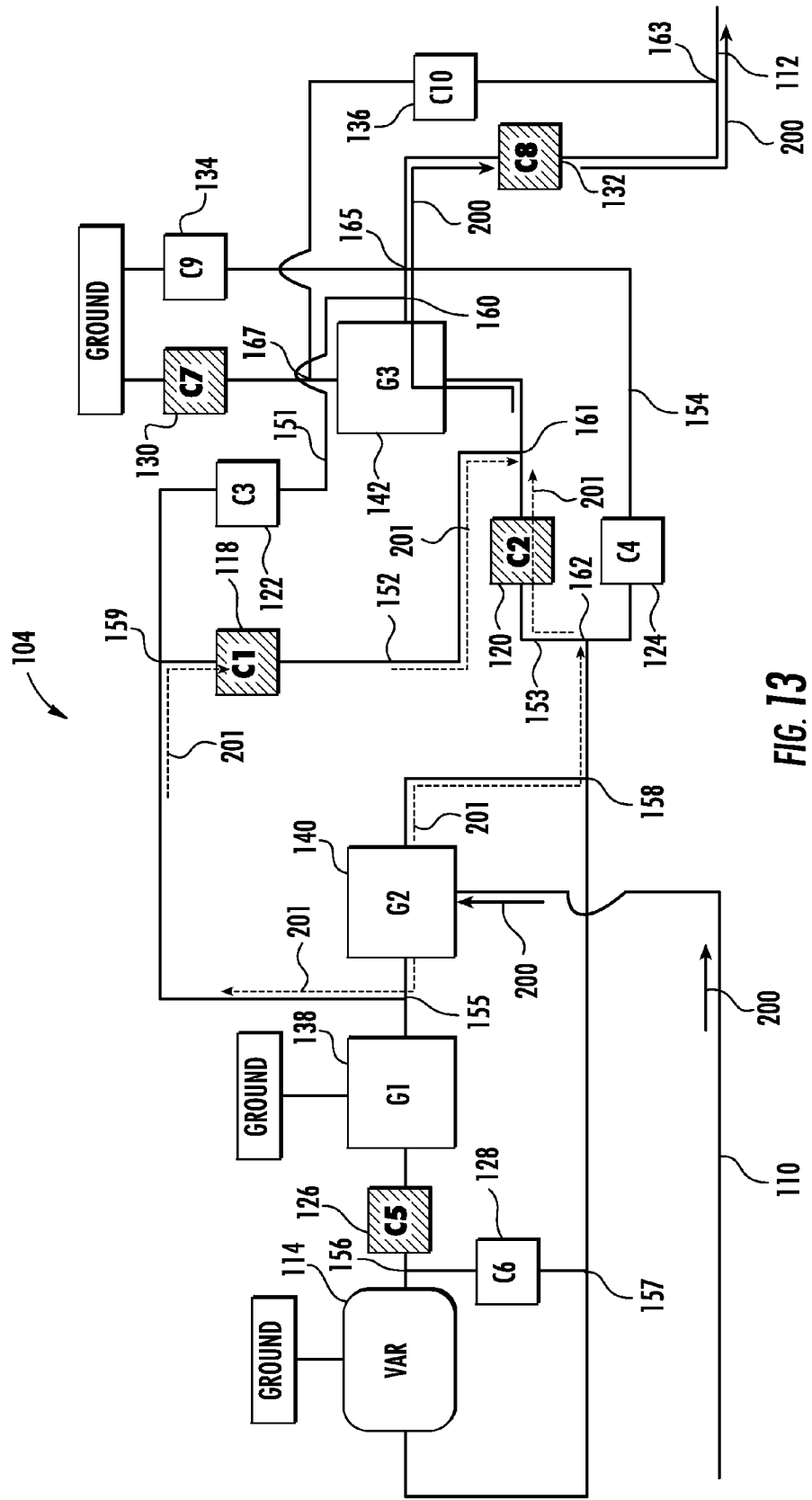
FIG. 13 is a block diagrammatic view of the continuously variable transmission of FIG. 3 showing power flow therethrough in a first forward synchronous operating mode.

Turning now to the "Sync 1-2" mode of table 190, power flows from the input shaft 110 to the output shaft 112 as shown in FIG. 13. Input power 200 (designated by the solid arrows) flows from the input shaft 110 to the second gearset 140 as shown in FIG. 13. Input power 200 transmitted to the second gearset 140 is modified by the "mixing" gearset 140 such that power output from the second gearset 140 becomes input power 201 as shown in FIG. 13. Input power 200 is reconstituted as discussed below at the junction 161, and input power 200 reconstituted at the junction 161 is transmitted to the junction 163 through the junctions 160, 165, the third gearset 142, and the eighth clutch 132 as shown in FIG. 13. Input power 200 transmitted to the junction 163 is transmitted thereafter to the output shaft 112.

Input power 201 (designated by the dashed arrows) is transmitted from the second gearset 140 to the junction 161 through the junctions 155, 159 and the first clutch 118, and also from the second gearset 140 to the junction 161 through the junctions 158, 162 and the second clutch 120 as shown in FIG. 13 (note that the variator 114 receives no power load). Input power 200 is thereby reconstituted at the junction 161, and the input power 200 is transmitted from the junction 161 to the output shaft 112 as indicated above.

Figure 14:
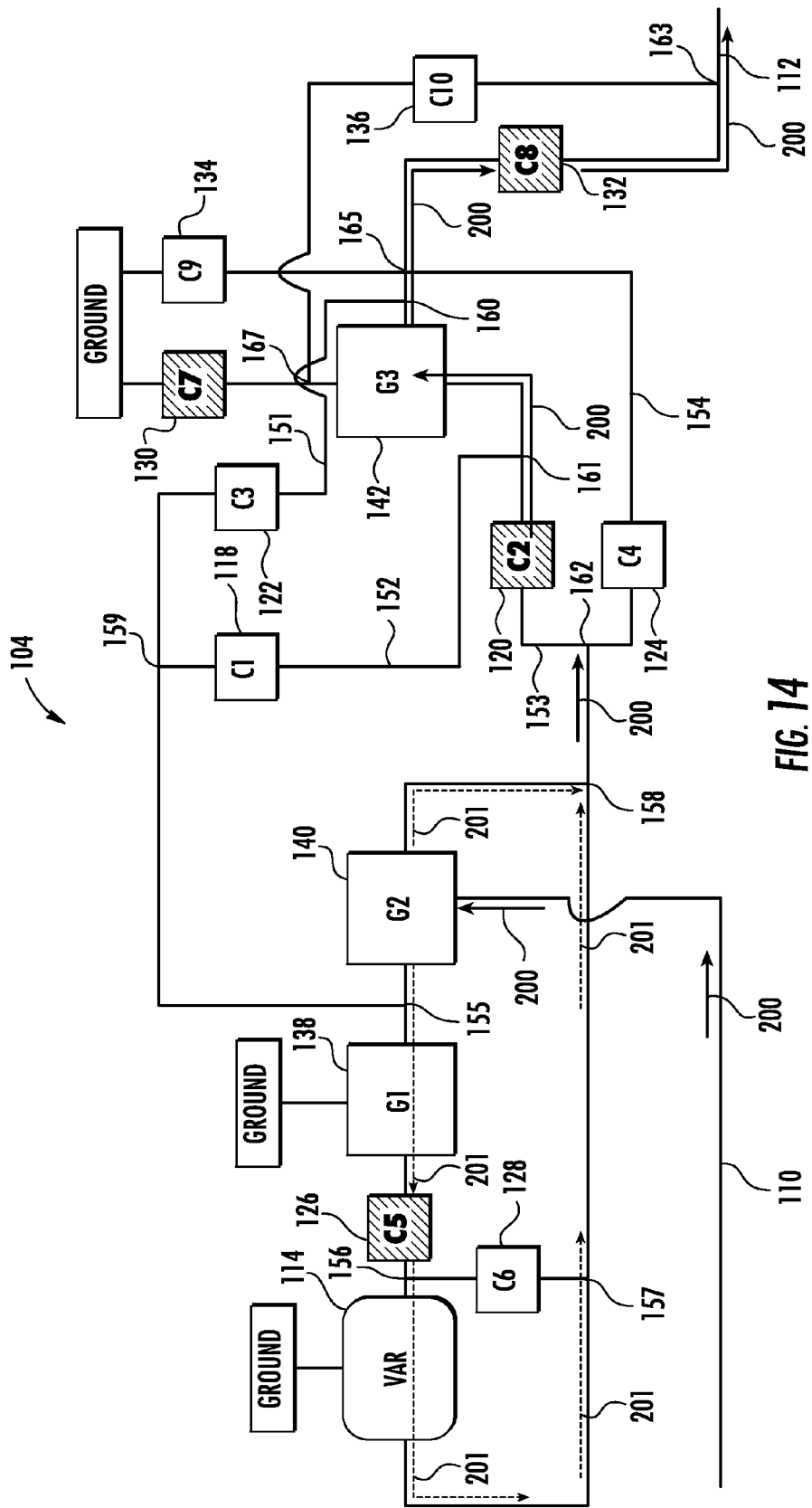
FIG. 14 is a block diagrammatic view of the continuously variable transmission of FIG. 3 showing power flow therethrough in a second forward operating mode.

Turning now to "Mode 2" of table 190, power flows from the input shaft 110 to the output shaft 112 as shown in FIG. 14. Input power 200 is transmitted from the input shaft 110 to the second gearset 140 as shown in FIG. 14. Input power 200 transmitted to the second gearset 140 is modified by the "mixing" gearset 140 such that power output from the second gearset 140 becomes input power 201 as shown in FIG. 14. Input power 200 is reconstituted as discussed below at the junction 158, and input power 200 reconstituted at the junction 158 is transmitted to the junction 163 through the junctions 162, 161, 160, 165, the second clutch 120, the third gearset 142, and the eighth clutch 132 as shown in FIG. 14. Input power 200 transmitted to the junction 163 is transmitted thereafter to the output shaft 112.

Input power 201 (designated by the dashed arrows) is transmitted from the second gearset 140 directly to the junction 158 and from the second gearset 140 to the junction 158 through the junctions 155, 156, 157, the first gearset 138, the launch clutch 126, and the variator 114 as shown in FIG. 14 (note that the variator 114 is subjected only to a portion of the power transmitted to the second gearset 140, i.e., input power 201). Input power 200 is thereby reconstituted at the junction 158, and the input power 200 is transmitted from the junction 158 to the output shaft 112 as indicated above.

Figure 15:
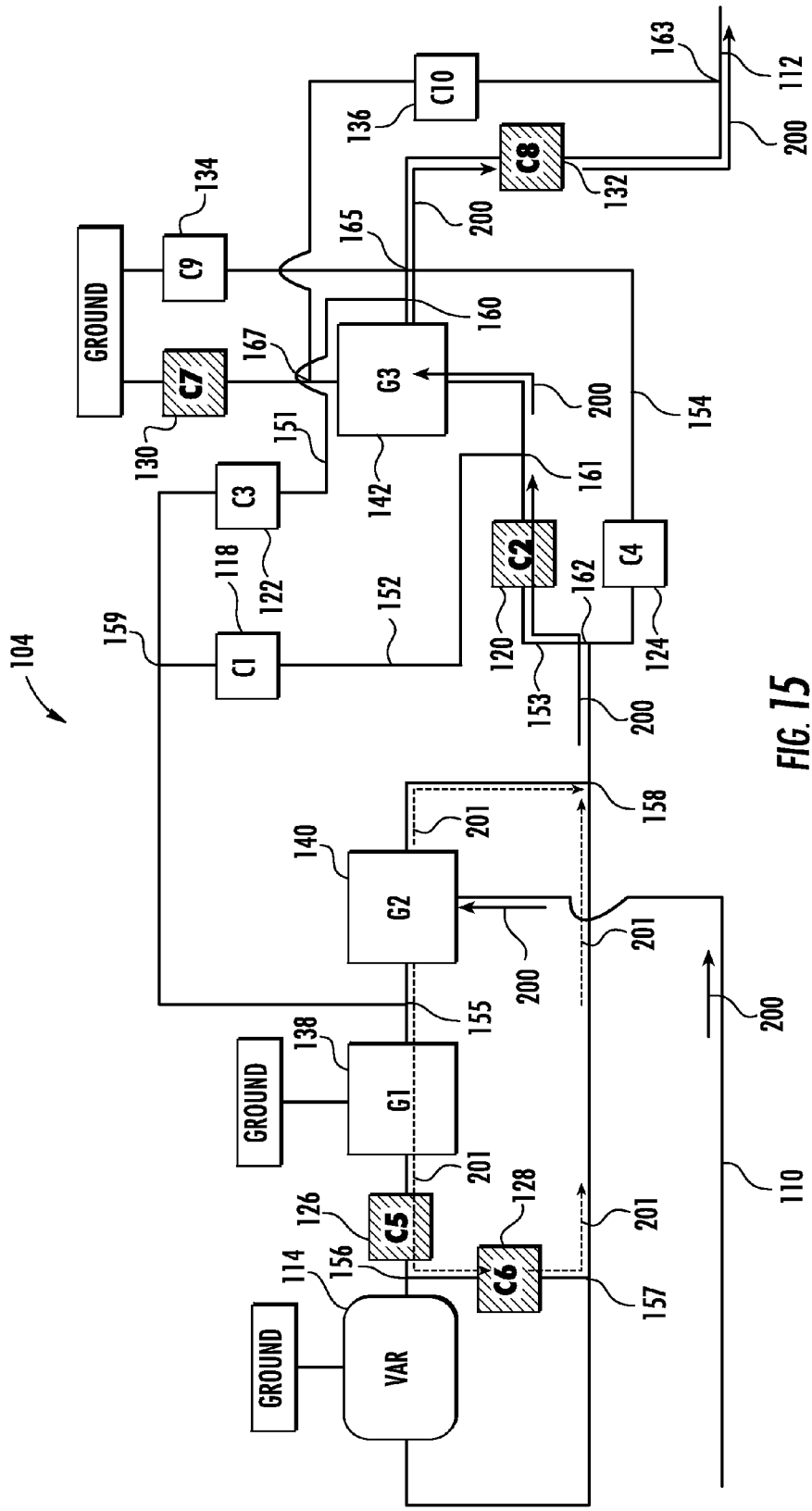
FIG. 15 is a block diagrammatic view of the continuously variable transmission of FIG. 3 showing power flow therethrough in a second forward variator bypass operating mode.

Turning now to the "Bypass 2" mode of table 190, power flows from the input shaft 110 to the output shaft 112 as shown in FIG. 15. Input power 200 (designated by the solid arrows) flows from the input shaft 110 to the second gearset 140 as shown in FIG. 15. Input power 200 transmitted to the second gearset 140 is modified by the "mixing" gearset 140 such that power output from the second gearset 140 becomes input power 201 as shown in FIG. 15. Input power 200 is reconstituted as discussed below at the junction 158, and input power 200 reconstituted at the junction 158 is transmitted to the junction 163 through the junctions 162, 161, 160, 165, the second clutch 120, the third gearset 142, and the eighth clutch 132 as shown in FIG. 15. Input power 200 transmitted to the junction 163 is transmitted thereafter to the output shaft 112.

Input power 201 (designated by the dashed arrows) is transmitted from the second gearset 140 directly to the junction 158 and from the second gearset 140 to the junction 158 through the junctions 155, 156, 157, the first gearset 138, the launch clutch 126, and the variator bypass clutch 128 as shown in FIG. 15 (note that the variator 114 is bypassed and receives no power load). Input power 200 is thereby reconstituted at the junction 158, and the input power 200 is transmitted from the junction 158 to the output shaft 112 as indicated above.

Figure 16:
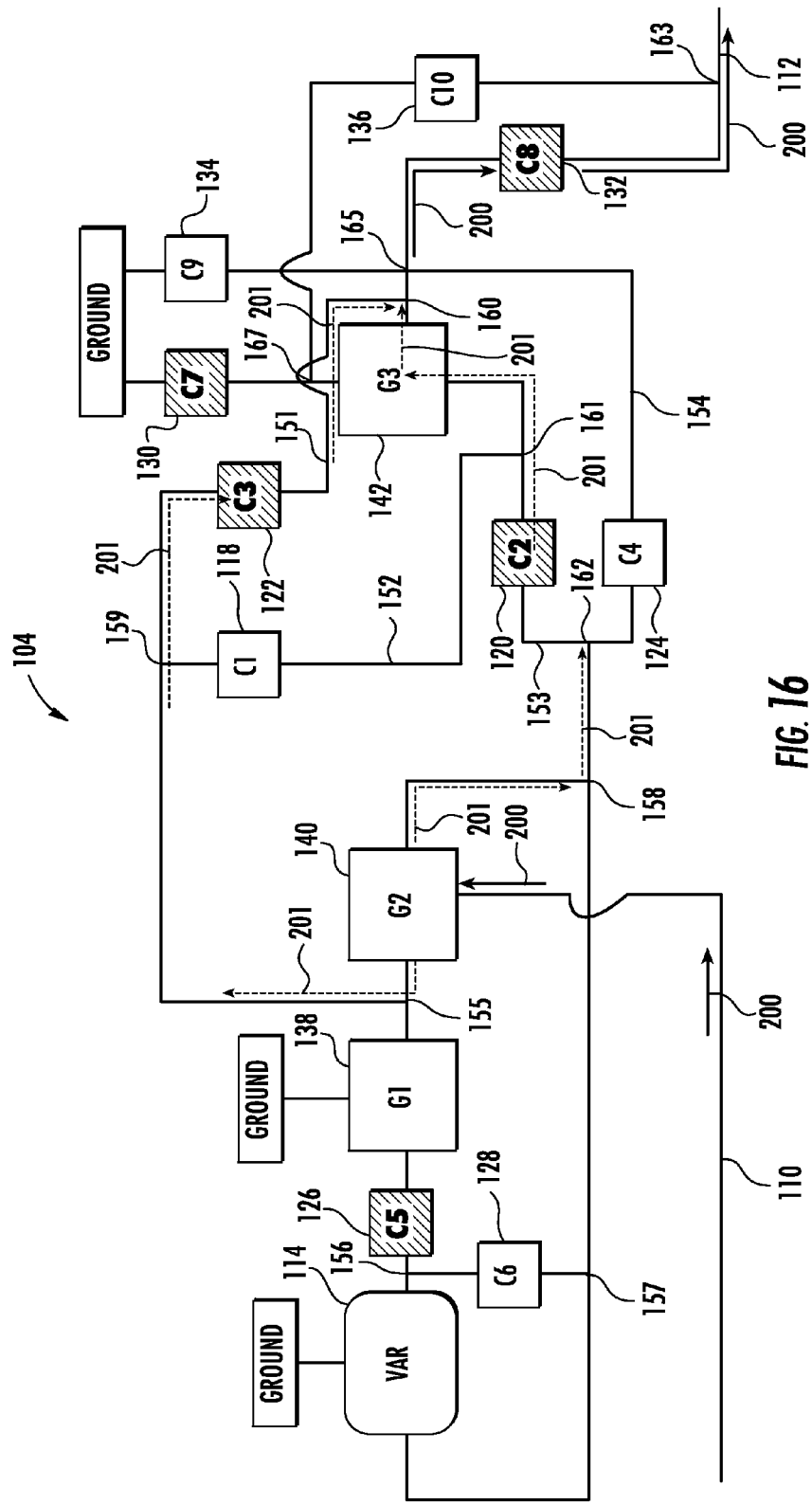
FIG. 16 is a block diagrammatic view of the continuously variable transmission of FIG. 3 showing power flow therethrough in a second forward synchronous operating mode.

Turning now to the "Sync 2-3" mode of table 190, power flows from the input shaft 110 to the output shaft 112 as shown in FIG. 16. Input power 200 (designated by the solid arrows) flows from the input shaft 110 to the second gearset 140 as shown in FIG. 16. Input power 200 transmitted to the second gearset 140 is modified by the "mixing" gearset 140 such that power output from the second gearset 140 becomes input power 201 as shown in FIG. 16. Input power 200 is reconstituted as discussed below at the junction 160, and input power 200 reconstituted at the junction 160 is transmitted to the junction 163 through the eighth clutch 132 and the junction 165 as shown in FIG. 16. Input power 200 transmitted to the junction 163 is transmitted thereafter to the output shaft 112.

Input power 201 (designated by the dashed arrows) is transmitted from the second gearset 140 to the junction 160 through the junctions 155, 159 and the third clutch 122, and also from the second gearset 140 to the junction 160 through the junctions 158, 162, 161, the second clutch 120, and the third gearset 142 as shown in FIG. 16 (note that the variator 114 receives no power load). Input power 200 is thereby reconstituted at the junction 160, and the input power 200 is transmitted from the junction 160 to the output shaft 112 as indicated above.

Figure 17:
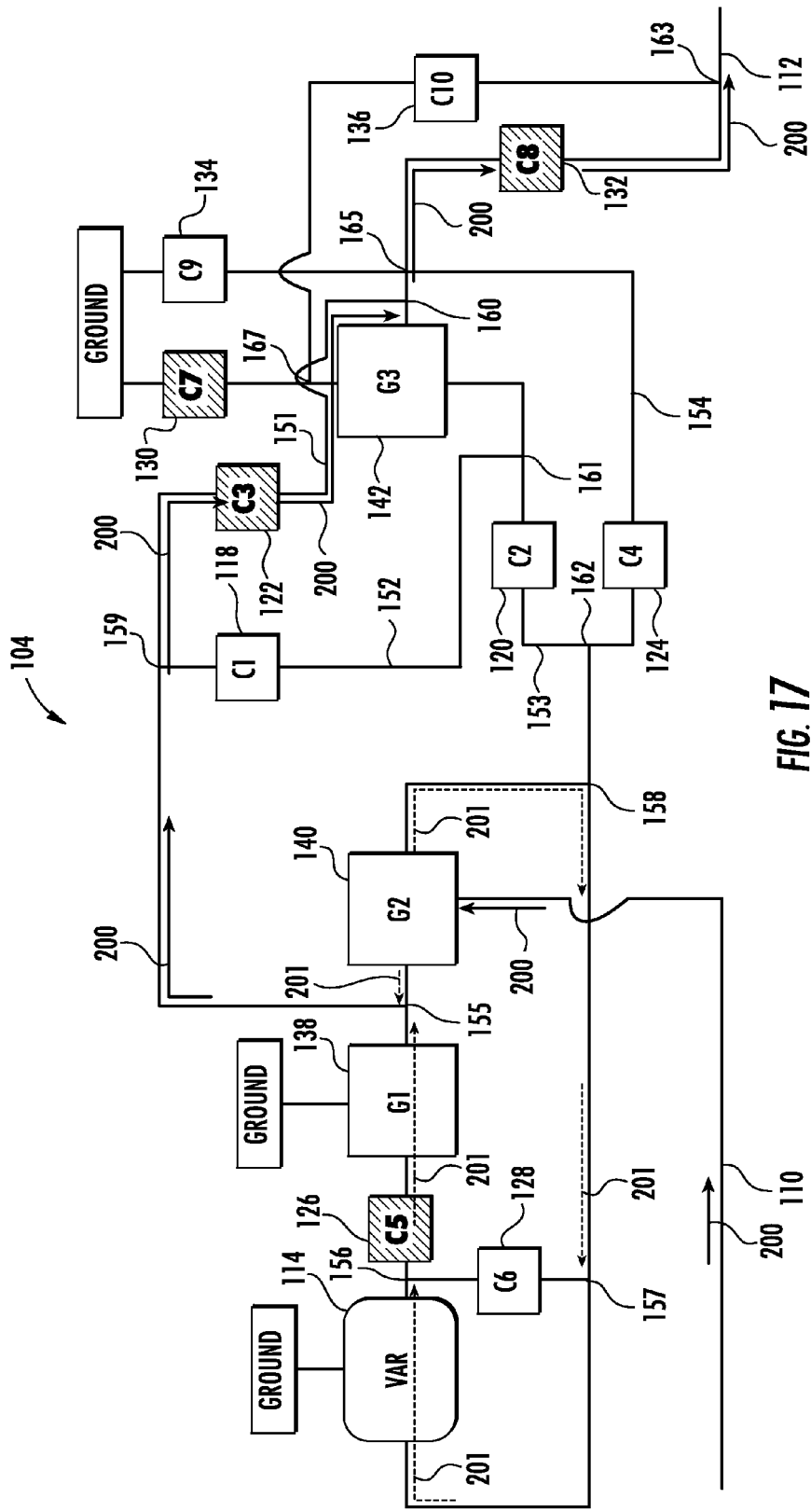
FIG. 17 is a block diagrammatic view of the continuously variable transmission of FIG. 3 showing power flow therethrough in a third forward operating mode.

Turning now to "Mode 3" of table 190, power flow from the input shaft 110 to the output shaft 112 is shown in FIG. 17. Input power 200 (designated by the solid arrows) flows from the input shaft 110 to the second gearset 140 as shown in FIG. 17. Input power 200 transmitted to the second gearset 140 is modified by the "mixing" gearset 140 such that power output from the second gearset 140 becomes input power 201 as shown in FIG. 17. Input power 200 is reconstituted as discussed below at the junction 155, and input power 200 reconstituted at the junction 155 is transmitted to the junction 163 through the junctions 159, 160, 165, the third clutch 122, and the eighth clutch 132 as shown in FIG. 17. Input power 200 transmitted to the junction 163 is transmitted thereafter to the output shaft 112.

Input power 201 (designated by the dashed arrows) is transmitted from the second gearset 140 directly to the junction 155 and also from the second gearset 140 to the junction 155 through the junctions 158, 157, 156, the first gearset 138, the launch clutch 126, and the variator 114 as shown in FIG. 17 (note that the variator 114 is subjected only to a portion of the input power 200 transmitted to the second gearset 140, i.e., input power 201). Input power 200 is thereby reconstituted at the junction 155, and the input power 200 is transmitted from the junction 155 to the output shaft 112 as indicated above.

Figure 18:
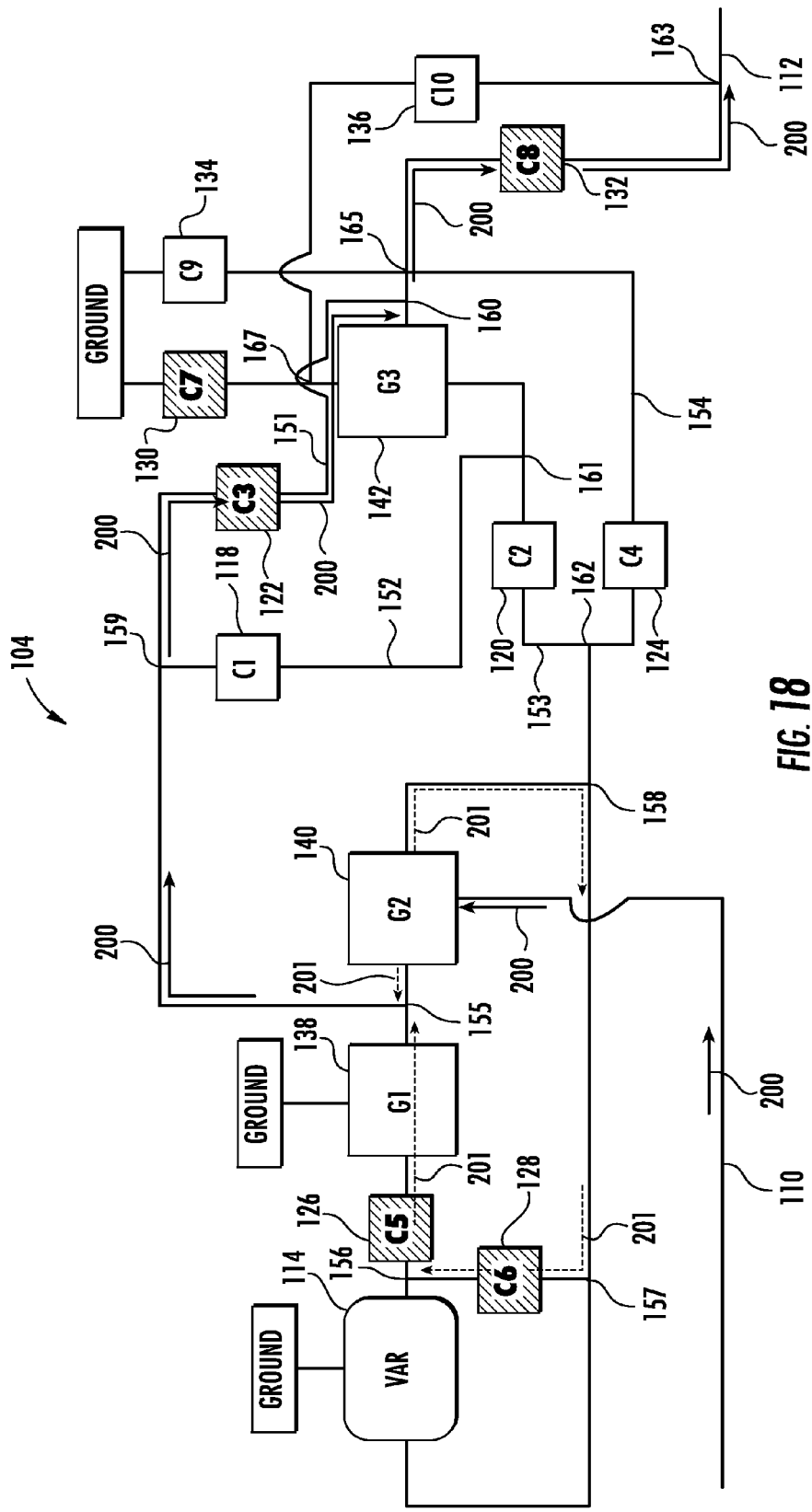
FIG. 18 is a block diagrammatic view of the continuously variable transmission of FIG. 3 showing power flow therethrough in a third forward variator bypass operating mode.

Turning now to the "Bypass 3" mode of table 190, power flows from the input shaft 110 to the output shaft 112 as shown in FIG. 18. Input power 200 (designated by the solid arrows) flows from the input shaft 110 to the second gearset 140 as shown in FIG. 18. Input power 200 transmitted to the second gearset 140 is modified by the "mixing" gearset 140 such that power output from the second gearset 140 becomes input power 201 as shown in FIG. 18. Input power 200 is reconstituted as discussed below at the junction 155, and input power 200 reconstituted at the junction 155 is transmitted to the junction 163 through the junctions 159, 160, 165, the third clutch 122, and the eighth clutch 132 as shown in FIG. 18. Input power 200 transmitted to the junction 163 is transmitted thereafter to the output shaft 112.

Input power 201 (designated by the dashed arrows) is transmitted from the second gearset 140 directly to the junction 155 and from the second gearset 140 to the junction 155 through the junctions 158, 157, 156, the first gearset 138, the launch clutch 126, and the variator bypass clutch 128 as shown in FIG. 18 (note that the variator 114 is bypassed and receives no power load). Input power 200 is thereby reconstituted at the junction 155, and the input power 200 is transmitted from the junction 155 to the output shaft 112 as indicated above.

Figure 19:
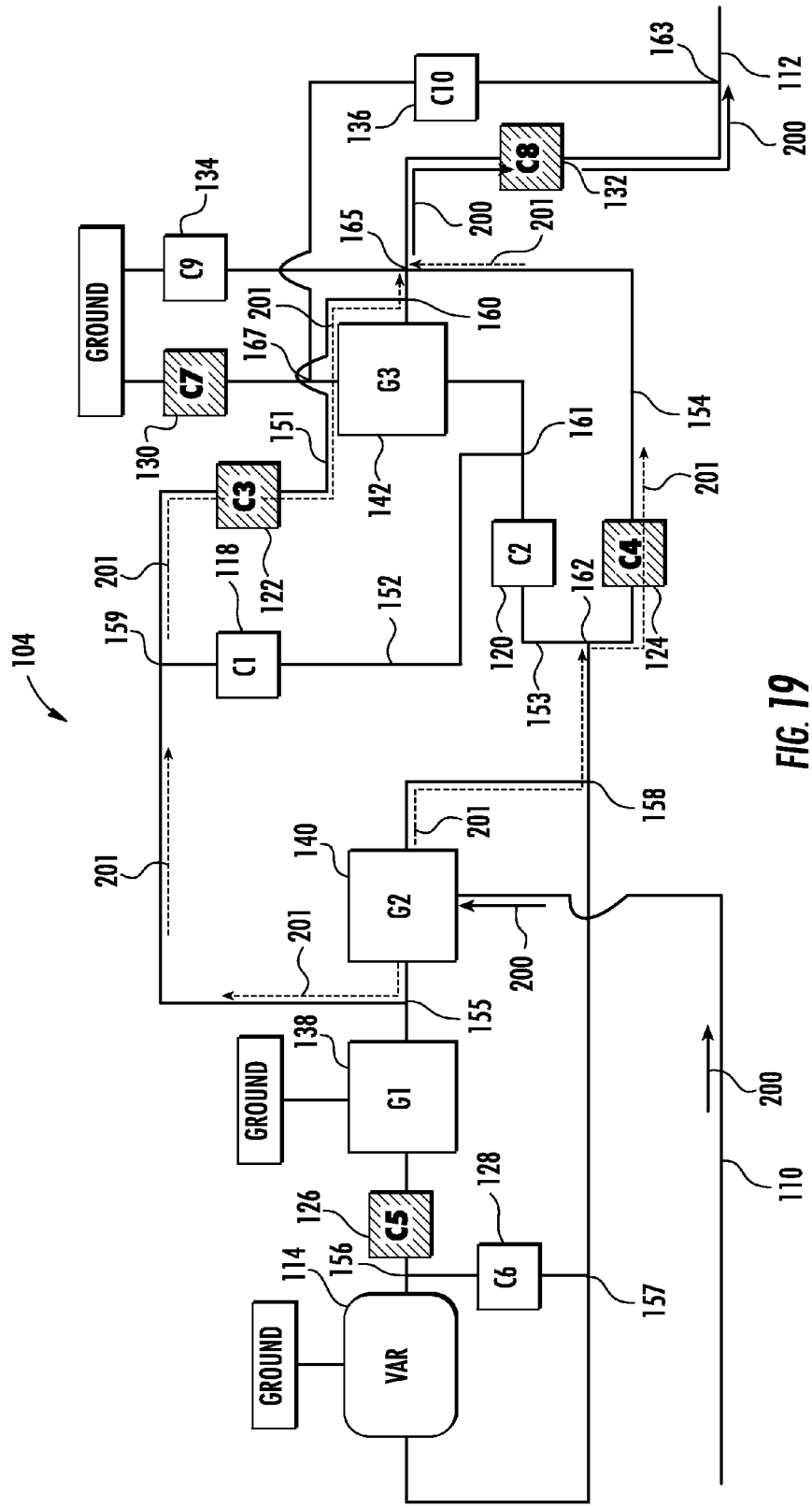
FIG. 19 is a block diagrammatic view of the continuously variable transmission of FIG. 3 showing power flow therethrough in a third forward synchronous operating mode.

Turning now to the "Sync 3-4" mode of table 190, power flows from the input shaft 110 to the output shaft 112 as shown in FIG. 19. Input power 200 (designated by the solid arrows) flows from the input shaft 110 to the second gearset 140 as shown in FIG. 19. Input power 200 transmitted to the second gearset 140 is modified by the "mixing" gearset 140 such that power output from the second gearset 140 becomes input power 201 as shown in FIG. 19. Input power 200 is reconstituted as discussed below at the junction 165, and input power 200 reconstituted at the junction 165 is transmitted to the junction 163 through the eighth clutch 132 as shown in FIG. 19. Input power 200 transmitted to the junction 163 is transmitted thereafter to the output shaft 112.

Input power 201 (designated by the dashed arrows) is transmitted from the second gearset 140 to the junction 165 through the junctions 155, 159, 160 and the third clutch 122, and also from the second gearset 140 to the junction 165 through the junctions 158, 162 and the fourth clutch 124 as shown in FIG. 19 (note that the variator 114 receives no power load). Input power 200 is thereby reconstituted at the junction 165, and the input power 200 is transmitted from the junction 165 to the output shaft 112 as indicated above.

Figure 20:
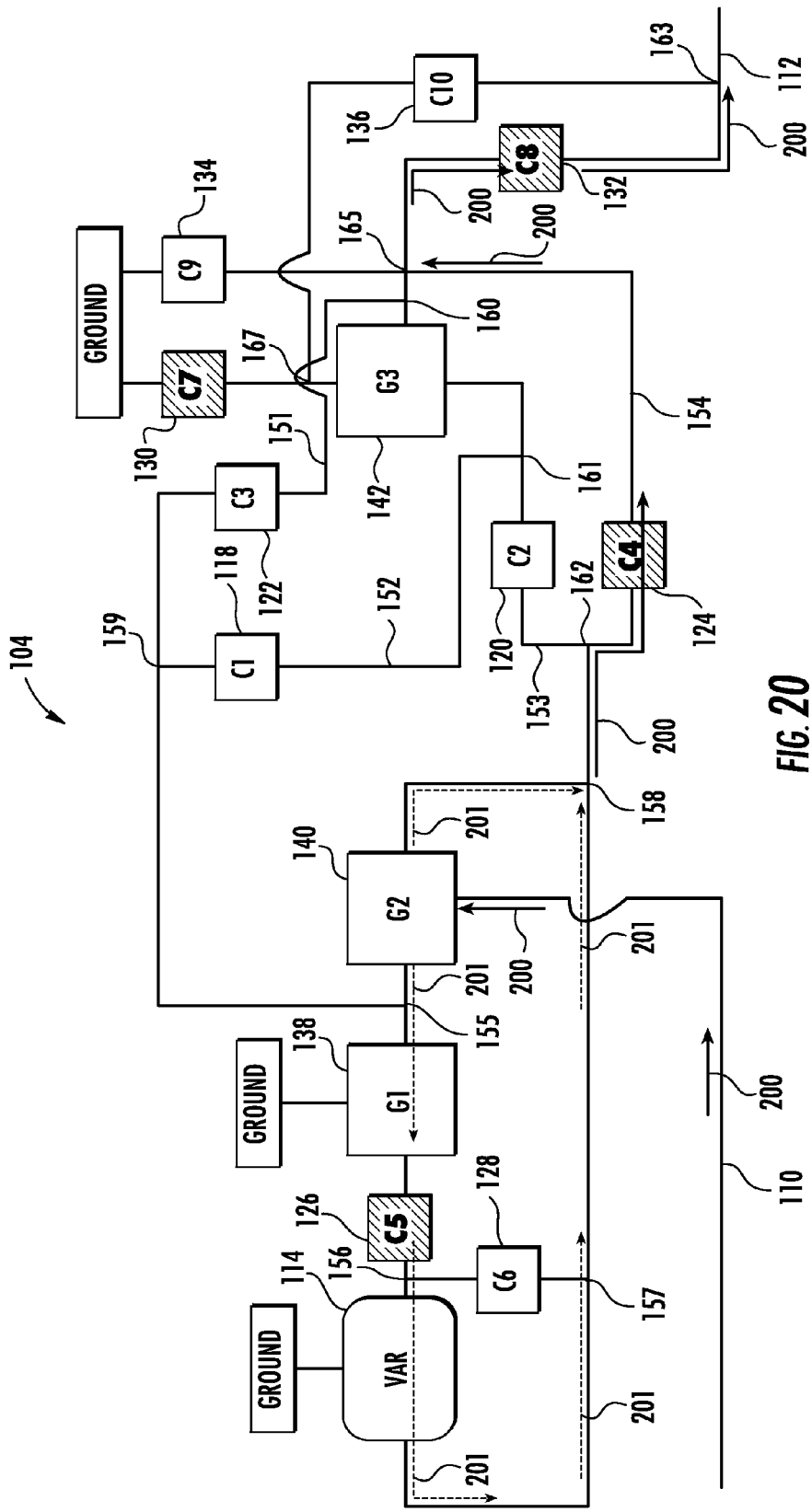
FIG. 20 is a block diagrammatic view of the continuously variable transmission of FIG. 3 showing power flow therethrough in a fourth forward operating mode.

Turning now to "Mode 4" of table 190, power flows from the input shaft 110 to the output shaft 112 as shown in FIG. 20. Input power 200 (designated by the solid arrows) flows from the input shaft 110 to the second gearset 140 as shown in FIG. 20. Input power 200 transmitted to the second gearset 140 is modified by the "mixing" gearset 140 such that power output from the second gearset 140 becomes input power 201 as shown in FIG. 20. Input power 200 is reconstituted as discussed below at the junction 158, and input power 200 reconstituted at the junction 158 is transmitted to the junction 163 through the junctions 162, 165, the fourth clutch 124, and the eighth clutch 132 as shown in FIG. 20. Input power 200 transmitted to the junction 163 is transmitted thereafter to the output shaft 112.

Input power 201 (designated by the dashed arrows) is transmitted from the second gearset 140 directly to the junction 158 and from the second gearset 140 to the junction 158 through the junctions 155, 156, 157, the first gearset 138, the launch clutch 126, and the variator 114 as shown in FIG. 20 (note that the variator 114 is subjected only to a portion of the power transmitted to the second gearset 140, i.e., input power 201). Input power 200 is thereby reconstituted at the junction 158, and the input power 200 is transmitted from the junction 158 to the output shaft 112 as indicated above.

Figure 21:
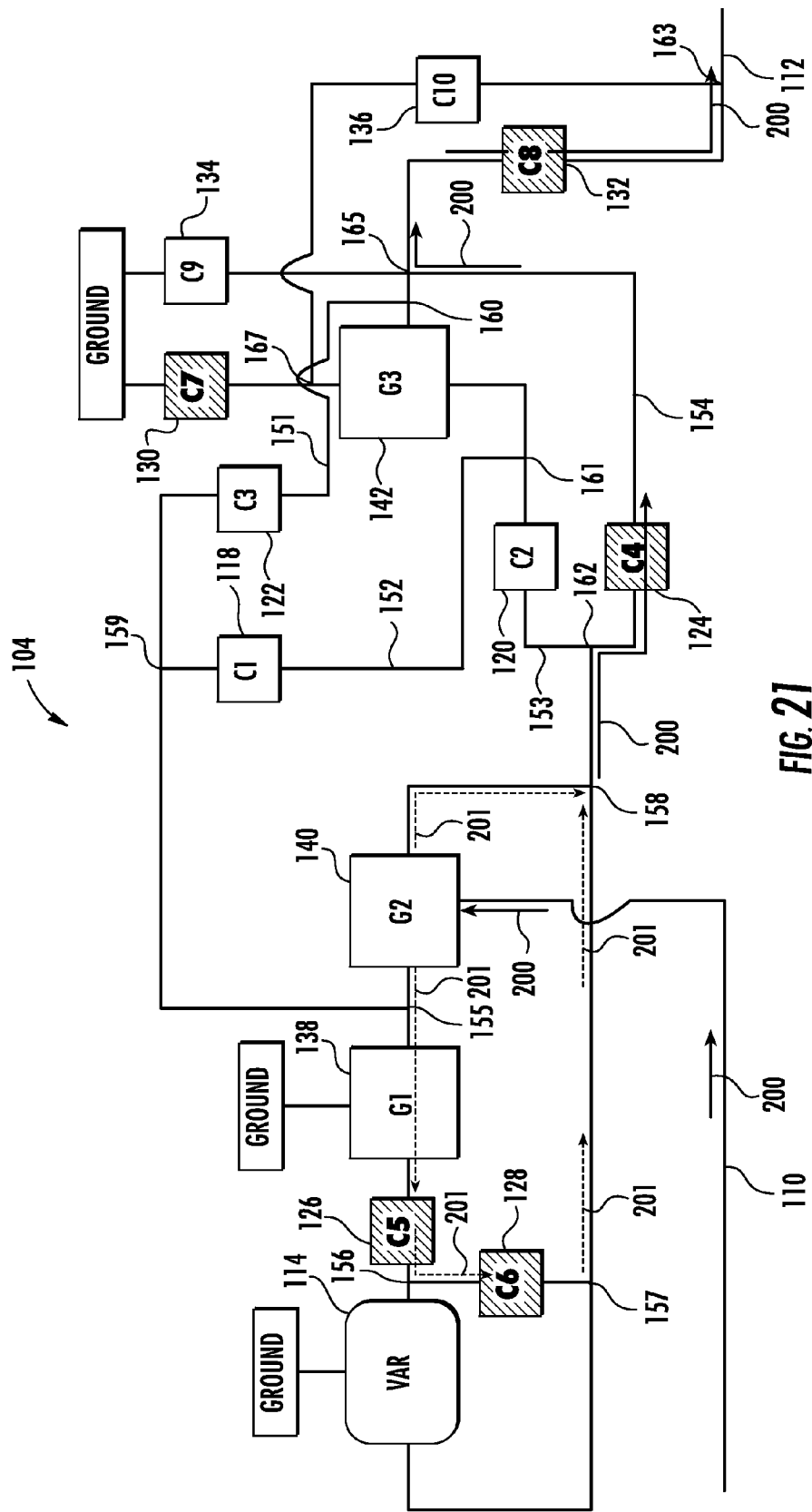
FIG. 21 is a block diagrammatic view of the continuously variable transmission of FIG. 3 showing power flow therethrough in a fourth forward variator bypass operating mode.

Turning now to the "Bypass 4" mode of table 190, power flows from the input shaft 110 to the output shaft 112 as shown in FIG. 21. Input power 200 (designated by the solid arrows) flows from the input shaft 110 to the second gearset 140 as shown in FIG. 21. Input power 200 transmitted to the second gearset 140 is modified by the "mixing" gearset 140 such that power output from the second gearset 140 becomes input power 201 as shown in FIG. 21. Input power 200 is reconstituted as discussed below at the junction 158, and input power 200 reconstituted at the junction 158 is transmitted to the junction 163 through the junctions 162, 165, the fourth clutch 124, and the eighth clutch 132 as shown in FIG. 21. Input power 200 transmitted to the junction 163 is transmitted thereafter to the output shaft 112.

Input power 201 (designated by the dashed arrows) is transmitted from the second gearset 140 directly to the junction 158 and from the second gearset 140 to the junction 158 through the junctions 155, 156, 157, the first gearset 138, the launch clutch 126, and the variator bypass clutch 128 as shown in FIG. 21 (note that the variator 114 is bypassed and receives no power load). Input power 200 is thereby reconstituted at the junction 158, and the input power 200 is transmitted from the junction 158 to the output shaft 112 as indicated above.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A transmission comprising:
an input shaft configured to receive torque from a drive unit,
an output shaft configured to transmit torque to a load,
at least three planetary gearsets arranged between the input shaft and the output shaft,
a planetary-type variator arranged between the input shaft and the output shaft, and
at least nine clutches arranged between the input shaft and the output shaft, the at least nine clutches selectively engageable in combination with one another to select one of at least one reverse mode and at least four forward modes, the at least nine clutches including a first clutch engageable to couple the planetary-type variator to one of the at least three planetary gearsets.

2. The transmission of claim 1, wherein (i) the at least one reverse mode includes no more than two reverse modes, and (ii) the transmission is operable to engage the first clutch in each of the two reverse modes and the at least four forward modes.

3. The transmission of claim 2, wherein the at least four forward modes include no more than four forward modes.

4. The transmission of claim 1, wherein (i) the at least one reverse mode includes no more than three reverse modes, and (ii) the at least four forward modes include no more than seven forward modes.

5. The transmission of claim 1, wherein (i) the at least three planetary gearsets include no more than three planetary gearsets, and (ii) the at least nine clutches include no more than nine clutches.

6. The transmission of claim 5, wherein two of the three planetary gearsets include an idler gear.

7. The transmission of claim 1, wherein the transmission is operable to engage four of the at least nine clutches in each of the at least one reverse mode and the at least four forward modes.

8. The transmission of claim 7, wherein the transmission is operable to engage (i) a pair of reverse clutches of the at least nine clutches in the at least one reverse mode and (ii) a pair of forward clutches of the at least nine clutches in each of the at least four forward modes.

9. The transmission of claim 8, wherein the transmission is operable to engage the first clutch in each of the at least one reverse mode and the at least four forward modes.

10. A transmission comprising:
a housing,
an input shaft configured to receive torque from a drive unit,
an output shaft configured to transmit torque to a load,
a variable-ratio unit arranged between the input shaft and the output shaft,
at least three planetary gearsets arranged between the input shaft and the output shaft, the at least three planetary gearsets including (i) a first planetary gearset coupled to the input shaft and the variable-ratio unit and (ii) a second planetary gearset coupled to the first planetary gearset, the variable-ratio unit, and the housing, wherein a ring gear of the first planetary gearset is coupled to the input shaft and a carrier of the first planetary gearset is coupled to the input of the variable-ratio unit,
at least eight clutches arranged between the input shaft and the output shaft, the at least eight clutches selectively engageable in combination with one another to select one of at least two reverse modes and at least four forward modes, and
a launch device coupled between the variable-ratio unit and the second planetary gearset, the launch device operable to transmit torque between the variable-ratio unit and the second planetary gearset.

11. The transmission of claim 10, wherein (i) a ring gear of the second planetary gearset is coupled to a sun gear of the first planetary gearset, (ii) a sun gear of the second planetary gearset is coupled to the output of the variable-ratio unit through the launch device, and (iii) a carrier of the second planetary gearset is coupled to the housing.

12. The transmission of claim 10, wherein the launch device is a launch clutch.

13. The transmission of claim 10, wherein the launch device is a torque converter.

14. The transmission of claim 10, wherein (i) the at least three planetary gearsets includes a third planetary gearset and (ii) two of the at least eight clutches are each engageable to couple the third planetary gearset to the output shaft.

15. The transmission of claim 14, wherein a first clutch of the two clutches is engageable to couple a ring gear of the third planetary gearset to the output shaft.

16. The transmission of claim 15, wherein a second clutch of the two clutches is engageable to couple a carrier of the third planetary gearset to the output shaft.

17. The transmission of claim 16, wherein one of the ring gear of the third planetary gearset and the carrier of the third planetary gearset is coupled to the output shaft.

18. The transmission of claim 10, wherein two of the at least three planetary gearsets include an idler gear.

19. A transmission comprising:
a housing,
an input shaft configured to receive torque from a drive unit,
an output shaft configured to transmit torque to a load,
a variable-ratio unit arranged between the input shaft and the output shaft,
at least three planetary gearsets arranged between the input shaft and the output shaft, the at least three planetary gearsets including (i) a first planetary gearset coupled to the input shaft and the variable-ratio unit, (ii) a second planetary gearset coupled to the first planetary gearset, the variable-ratio unit, and the housing, and (iii) a third planetary gearset having a first element coupled to the housing and a second element coupled to the output shaft,
at least eight clutches arranged between the input shaft and the output shaft, the at least eight clutches selectively engageable in combination with one another to select one of at least two reverse modes and at least four forward modes, and
a torque converter coupled between the variable-ratio unit and the second planetary gearset, the torque converter operable to transmit torque between the variable-ratio unit and the second planetary gearset.

* * * * *